(12) United States Patent
Fujikawa

(10) Patent No.: US 11,402,712 B2
(45) Date of Patent: Aug. 2, 2022

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/193,538

(22) Filed: Mar. 5, 2021

(65) Prior Publication Data

US 2021/0278735 A1  Sep. 9, 2021

(30) Foreign Application Priority Data

Mar. 6, 2020 (JP) .............................. JP2020-038522

(51) Int. Cl.
  *G09G 3/36* (2006.01)
  *G02F 1/1362* (2006.01)
  *G02F 1/1368* (2006.01)

(52) U.S. Cl.
  CPC ...... *G02F 1/136286* (2013.01); *G02F 1/1368* (2013.01); *G09G 3/3648* (2013.01); *G09G 2300/0814* (2013.01)

(58) Field of Classification Search
  CPC ............ G02F 1/136286; G02F 1/1368; G09G 3/3648; G09G 2300/0814
  See application file for complete search history.

(56) References Cited

U.S. PATENT DOCUMENTS

| | | | |
|---|---|---|---|
| 2017/0018237 A1* | 1/2017 | Park | G09G 3/3696 |
| 2017/0162093 A1* | 6/2017 | Kang | G02F 1/136286 |
| 2017/0186390 A1* | 6/2017 | Fujikawa | G09G 3/3677 |
| 2018/0261180 A1* | 9/2018 | Zhou | G09G 3/3688 |
| 2019/0139505 A1 | 5/2019 | Fujikawa | |
| 2020/0211492 A1 | 7/2020 | Fujikawa | |

FOREIGN PATENT DOCUMENTS

| | | |
|---|---|---|
| JP | 2007-240830 A | 9/2007 |
| JP | 2009-093048 A | 4/2009 |
| JP | 2013-097100 A | 5/2013 |
| JP | 2017-120300 A | 7/2017 |

* cited by examiner

*Primary Examiner* — Sanghyuk Park
(74) *Attorney, Agent, or Firm* — Oliff PLC

(57) ABSTRACT

In an electro-optical device, a transmission gate includes two or more n-channel type transistors controlled by a positive logic selection signal line and a p-channel type transistor controlled by a negative logic selection signal line. Each of the selection signal lines includes a main line part extending in a first direction and a branch line part extending in a second direction, and the n-channel type transistors and the p-channel type transistor are alternately arranged along the second direction.

11 Claims, 18 Drawing Sheets

ELECTRO-OPTICAL DEVICE AND ELECTRONIC APPARATUS

The present application is based on, and claims priority from JP Application Serial Number 2020-038522, filed Mar. 6, 2020, the disclosure of which is hereby incorporated by reference herein in its entirety.

BACKGROUND

1. Technical Field

The present disclosure relates to an electro-optical device including a CMOS-type transmission gate and an electronic apparatus.

2. Related Art

In a demultiplexer-type electro-optical device, data lines are divided into blocks by a plurality of rows, and a transmission gate distributes a data signal, which is supplied from a data signal line provided correspondingly for each block, to each data line. This electro-optical device has a configuration of using a CMOS-type transmission gate for the purpose of improving writing speed of a data signal in a data line (see JP-A-2007-240830). FIG. 9 in JP-A-2007-240830 discloses a mode in which respective main line parts of positive logic selection signal lines and negative logic selection signal lines extend in a first direction (an X direction in JP-A-2007-240830) on the same side with respect to the transmission gate, and in which respective branch line parts of the positive logic selection signal lines and the negative logic selection signal lines extend in a second direction (a Y direction in JP-A-2007-240830) toward the transmission gate. Further, FIG. 6 in JP-A-2007-240830 discloses a mode in which the respective main line parts of the positive logic selection signal lines and the negative logic selection signal lines extend in the first direction on sides opposite to each other with respect to the transmission gate, and in which the branch line parts of the positive logic selection signal lines extend in the second direction toward the transmission gate and the branch line parts of the negative logic selection signal lines extend in a direction opposite to the second direction toward the transmission gate.

In the mode illustrated in FIG. 6 in JP-A-2007-240830, the positive logic selection signal lines and the negative logic selection signal lines are arranged on the sides opposite to each other with respect to the transmission gate. Specifically, input wiring lines for a data signal and the negative logic selection signal lines intersect one another, and the data lines and the positive logic selection signal lines intersect one another. At each of the intersection points, a parasitic capacitance is generated due to wiring line intersection. The parasitic capacitance differs among the positive logic selection signal lines and the negative logic selection signal lines, and thus dullness differs among the signals, which is described in paragraph [0026] and the like in JP-A-2007-240830. A difference in such waveform dullness is noticeable when the number of pixels is increased.

Meanwhile, in a case of the transmission gate illustrated in FIG. 9 in JP-A-2007-240830, first conductive-type transistors and second conductive-type transistors are arranged along the second direction. Thus, a wiring line length largely differs among the branch line parts of the positive logic selection signal lines and the branch line parts of the negative logic selection signal lines. Further, at the branch line part, a parasitic capacitance is generated due to adjacent wiring lines and wiring line intersection, in addition to a gate capacitance of the transmission gate. Therefore, a large difference in signal dullness is caused among the positive logic selection signal lines and the negative logic selection signal lines. In consideration of a resistance difference caused by the wiring line length difference among the branch line parts, just at the branch line parts, a difference in signal dullness is also caused among the positive logic selection signal lines and the negative logic selection signal lines. Specifically, in any one of the modes in FIG. 6 and FIG. 9 in JP-A-2007-240830, a parasitic capacitance differs among the positive logic selection signal lines and the negative logic selection signal lines. Thus, dullness differs among the signals, and the difference is noticeable when the number of pixels is increased. In this case, a feed-through voltage, which is generated when writing of a data signal in the data lines is completed, that is, the transmission gate is turned off, differs among the data lines of the positive logic selection signal lines and the positive logic selection signal lines on the input side and the data lines thereof on the terminal end side. In this case, when an optimal common voltage is adjusted, for example, the optimal common voltage is set at a screen center. With this, the optimal common voltage is not set at a display end portion, which causes a problem of generation of a flicker.

SUMMARY

In order to solve the above-mentioned problem, an electro-optical device according to the present disclosure a plurality of data lines including m (m is an integer equal to or greater than 2) data lines grouped together, a data signal line configured to output a data signal in accordance with a gray scale of a pixel correspondingly to the m data lines, m positive logic selection signal lines supplied with a positive logic selection signal, m negative logic selection signal lines supplied with a negative logic selection signal paired with the positive logic selection signal, and a transmission gate including an input end coupled to the data signal line and an output end coupled to any of the m data lines, and causing a conduction state between the input end and the output end to be defined based on the positive logic selection signal and the negative logic selection signal, wherein the transmission gate includes at least two first conductive-type transistors including a gate electrode supplied with the positive logic selection signal and a second conductive-type transistor including a gate electrode supplied with the negative logic selection signal, and when an alignment direction of the plurality of data lines is a first direction, and an extension direction of the plurality of data lines is a second direction, the first conductive-type transistor and the second conductive-type transistor are arranged along the second direction, and the second conductive-type transistor is arranged between the two first conductive-type transistors when viewed in the first direction.

The electro-optical device according to the present disclosure may be used in various types of electronic apparatuses such as a direct-view-type display apparatus and a projection-type display apparatus. When the electronic apparatus is a projection-type display apparatus, the projection-type display apparatus includes a light-source unit configured to emit light supplied to the electro-optical device and a projection optical system configured to project light modulated by the electro-optical device.

DESCRIPTION OF EXEMPLARY EMBODIMENTS

Figure 1:
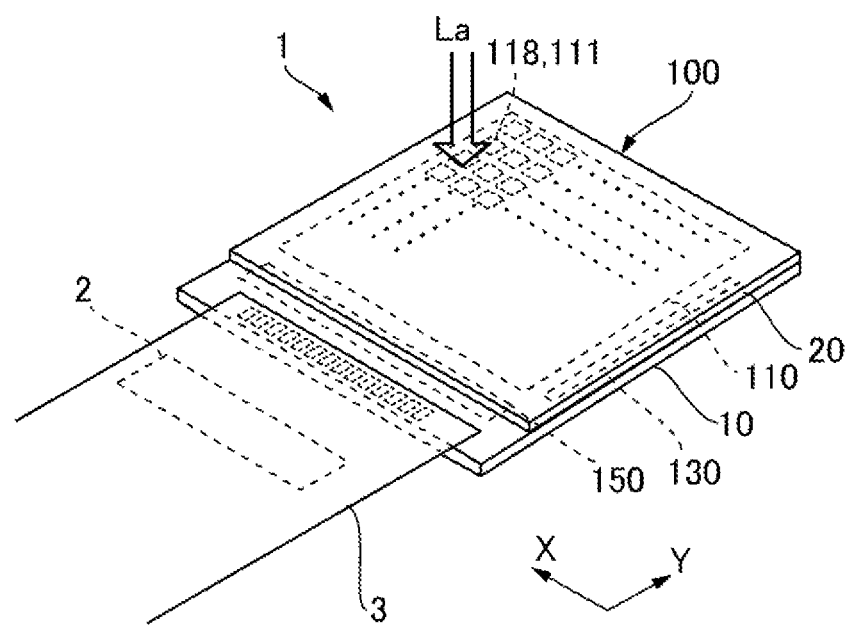
FIG. 1 is an explanatory view schematically illustrating one aspect of an electro-optical device to which the present disclosure is applied.

With reference to the drawings, Exemplary Embodiments of the present disclosure are described. Note that, in the drawings referred in the following description, for the purpose of illustrating each member and the like in a recognizable size in the drawing sheet, each member is illustrated at a different scale. In the following description, an alignment direction of a plurality of data lines 114 is indicated with a first direction X, and an extension direction of the data lines 114 is indicated with a second direction Y.

Exemplary Embodiment 1

1. Basic Configuration of Electro-Optical Device 1

FIG. 1 is an explanatory view schematically illustrating one aspect of an electro-optical device 1 to which the present disclosure is applied. The electro-optical device 1 illustrated in FIG. 1 is a liquid crystal device used as a light valve described later or the like, and the electro-optical device 1 includes a liquid crystal panel serving as an electro-optical panel 100. In the electro-optical panel 100, a second substrate 20 formed with a common electrode (not illustrated) and the like is bonded to a first substrate 10 formed with pixel electrodes 118 and the like with a seal material (not illustrated). In the electro-optical panel 100, a region surrounded by the sealant is provided with a liquid crystal layer (not illustrated). The electro-optical panel 100 is a transmission-type liquid crystal panel, for example. Thus, as indicated with an arrow La, the light incident from the second substrate 20 side is modulated before being emitted from the first substrate 10 side. A flexible wiring substrate 3 mounted with a drive IC 2 is coupled to the first substrate 10. The drive IC 2 outputs an image signal indicating an image displayed on the electro-optical panel 100, based on a clock signal, a control signal, image data, or the like, which is input from an external upper circuit (not illustrated) via the flexible wiring substrate 3.

2. Electrical Configuration of Electro-Optical Device 1

Figure 2:
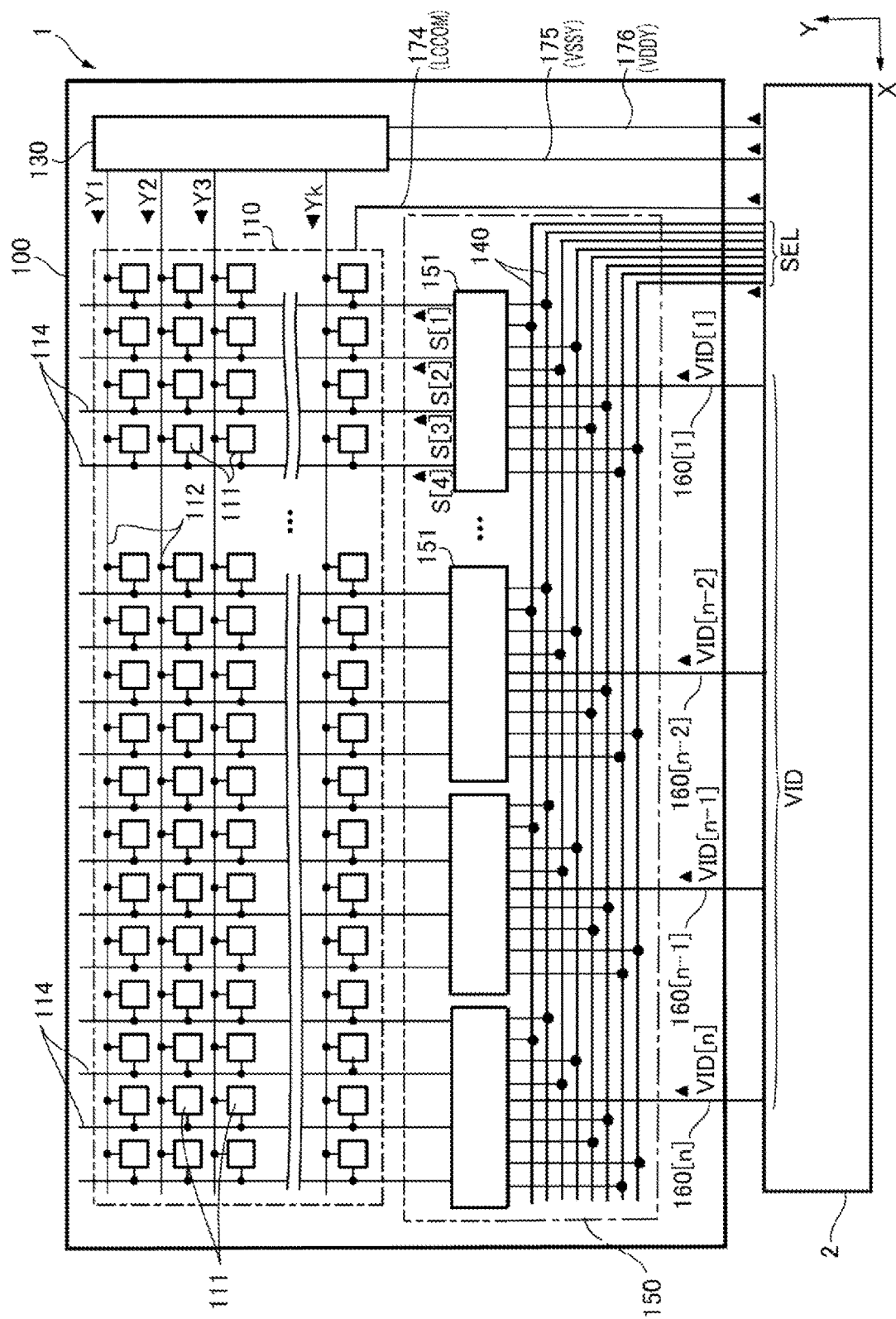
FIG. 2 is an explanatory view illustrating an electrical configuration of the electro-optical device illustrated in FIG. 1.

FIG. 2 is an explanatory view illustrating an electrical configuration of the electro-optical device 1 illustrated in FIG. 1. As illustrated in FIG. 2, the electro-optical panel 100 is provided with a display region 110, a scanning lien drive circuit 130, a data line selection circuit 150, a plurality of data signal lines 160, a plurality of selection signal lines 140, and constant voltage lines 174, 175, and 176, which are described below. Those elements are formed at the first substrate 10 illustrated in FIG. 1. Further, at the first substrate 10, the data line selection circuit 150 is formed along one side of a peripheral portion of the display region 110, and the scanning line drive circuit 130 is formed along another side intersecting the side along which the data line selection circuit 150 is formed.

The display region 110 includes k scanning lines 112 extending from the scanning line drive circuit 130 in the first direction X being a column direction, the plurality of data lines 114 extending from the data line selection circuit 150 in the second direction Y being a row direction, and a plurality of pixels 111. k is an integer equal to or greater than 1. The pixels 111 are provided correspondingly to intersections between the scanning lines 112 and the data lines 114, and are aligned in a matrix. The scanning lines 112 are signal lines that transmit scanning signals Y[1], Y[2], Y[3] .... The data lines 114 are signal lines that transmit image signals S[1], S[2], S[3], . . . to the respective pixels 111.

The data lines 114 are divided into n groups by m data lines. Therefore, the (m×k) pixels 111 corresponding to the m data lines 114 constitute one group. The pixels 111 belonging to the same group are coupled to the same data signal line 160 via the data line selection circuit 150. Therefore, the number of the data signal lines 160 is n, and the number of the pixels 111 is k×(m×n). n is an integer equal to or greater than 1, and m is an integer equal to or greater than 2. In the present exemplary embodiment, a case where m=4 is satisfied is mainly described.

The scanning line drive circuit 130 selects a column in which data is written, among the plurality of pixels 111 arranged in a matrix. Specifically, the scanning line drive circuit 130 outputs a scanning lines for selecting one scanning line 112 among the plurality of scanning lines 112. The scanning line drive circuit 130 supplies the scanning signals Y1, Y2, Y3, . . . to the scanning lines 112 in a first column, a second column, a third column, . . . . The scanning signals Y1, Y2, Y3, ... are signals that are sequentially at higher levels in an exclusive manner, for example.

The data signal lines 160 are signal lines that transmit data signals VID to the data line selection circuit 150, and n data signal lines are provided correspondingly to the n groups, respectively. The data signal VID is a signal indicating data written in the pixel 111, and is a signal in accordance with a gray scale of the pixel 111. Here, the "image" refers to a still image or a moving image. One data signal line 160 is coupled to the m data lines 114 via the data line selection circuit 150. Therefore, the data signal VID is obtained by performing time division multiplex for data supplied to the m data lines 114.

The selection signal lines 140 are signal lines that transmit selection signals SEL. The data line selection circuit 150 includes n demultiplexers 151 corresponding to the n groups, respectively. In each group, a row of the pixels 111 in which an image signal is written is selected. Specifically, the data line selection circuit 150 selects one data line 114 among the m data lines 114 belonging to one group, based on the selection signal SEL. As a result, the data lines 114 are electrically coupled to one corresponding data signal line 160 vis the data line selection circuit 150. The specific configurations of the demultiplexers 151 and the pixels 111 are described later with reference to FIG. 3.

The electro-optical panel 100 is provided with the constant voltage lines 174, 175, and 176 to which a power source voltage is supplied via the flexible wiring substrate 3. The power source voltage is a DC voltage used as a power source in the electro-optical panel 100. The constant voltage line 174 is a wiring line that supplies a common voltage LCCOM, the constant voltage line 175 is a wiring line that supplies a voltage VSSY on a low voltage side, and the constant voltage line 176 is a wiring line that supplies a voltage VDDY on a high voltage side. Note that, in some cases, the scanning line drive circuit 130 is provided on each of both right and left sides of the display region 110.

3. Configurations of Demultiplexers 151 and Pixels 111

Figure 3:
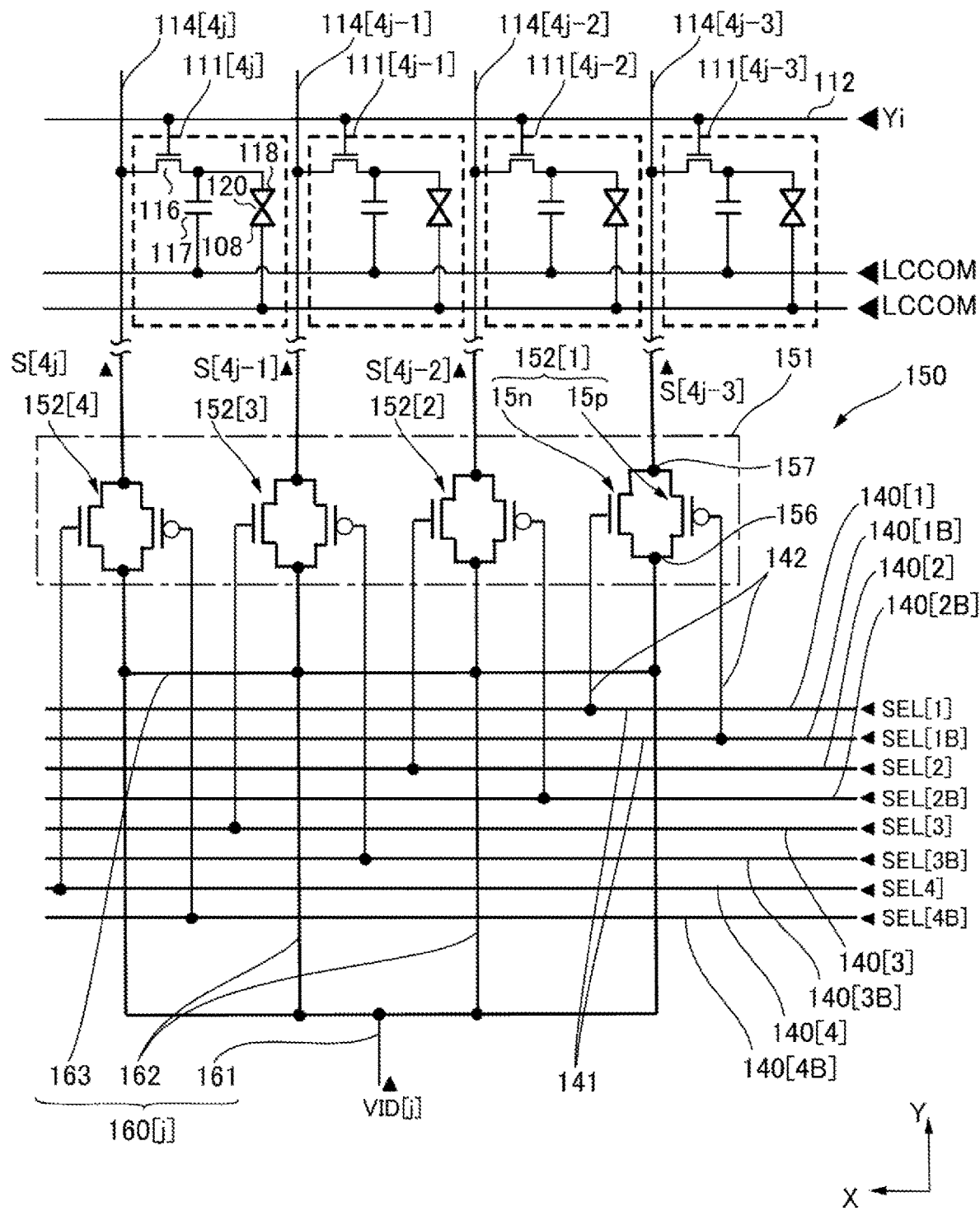
FIG. 3 is an explanatory view illustrating configurations of pixels and the like illustrated in FIG. 2.

FIG. 3 is an explanatory view illustrating configurations of the pixels 111 and the like illustrated in FIG. 2. FIG. 3 illustrates the pixels 111 from a (m×j−3)-th row to a (m×j)-th row in an i-th column in the display region 110 and the demultiplexer 151 corresponding to those pixels. i is an integer that satisfies 1≤i≤k, and j is an integer that satisfies 1≤j≤n. In the present exemplary embodiment, m is 4. Thus, FIG. 3 illustrates the pixels 111 from a (4j−3)-th row to a (4j)-th row in the i-th column in the display region 110.

The pixel 111 includes a pixel switching element 116 formed of a Thin Film Transistor (TFT) or the like, a pixel electrode 118, a liquid crystal layer 120, a common electrode 108, and a retention capacitor 117. The pixel switching element 116 is a switching element that controls writing of a data signal in the pixel electrode 118. In the present exemplary embodiment, the pixel switching element 116 is an n-channel type field effect transistor. The pixel switching element 116 includes a gate electrode coupled to the scanning line 112, a source electrode coupled to the data line 114, and a drain electrode coupled to the pixel electrode 118. When a scanning signal at a high level is supplied to the scanning line 112, the pixel switching element 116 is in an on state, and an image signal is supplied to the pixel electrode 118. When a scanning line at a low level is supplied to the scanning line 112, the pixel switching element 116 is in an off state. The common electrode 108 is a common for all the pixels 111. The common electrode 108 is applied with the common voltage LCCOM. The liquid crystal layer 120 is applied with a voltage equivalent to a voltage difference between the pixel electrode 118 and the common electrode 108, and optical characteristics are changed in accordance with the applied voltage. The retention capacitor 117 retains an electric charge equivalent to a voltage difference between the pixel electrode 118 and the common voltage LCCOM.

The demultiplexer 151 is a circuit that supplies the data signal VID to the data line 114 selected based on the selection signal SEL in each group. One demultiplexer 151 includes m transmission gates 152. Each of the m transmission gates 152 includes an input end 156 coupled to the data signal line 160 and an output end 157 coupled to any one of the four data lines 114. Further, for each of the m transmission gates 152, a conduction state between the input end 156 and the output end 157 is defined in accordance with the selection signal SEL. As a result, the data line 114 is selected. In the present exemplary embodiment, m is 4. Thus, one demultiplexer 151 is provided with four transmission gates 152[1], 152[2], 152[3], and 152[4].

In the present exemplary embodiment, the transmission gate 152 includes a CMOS circuit. Therefore, the transmission gate 152 is supplied with positive logic selection signals SEL[1], SEL[2], SEL[3], and SEL[4] via four positive logic selection signal lines 140[1], 140[2], 140[3], and 140[4]. Further, the transmission gate 152 is supplied with negative logic selection signals SEL[1B], SEL[2B], SEL[3B], and SEL[4B] via four negative logic selection signal lines 140[1B], 140[2B], 140[3B], and 140[4B]. Here, the negative logic selection signals SEL[1B], SEL[2B], SEL[3B], and SEL[4B] correspond to the positive logic selection signals SEL[1], SEL[2], SEL[3], and SEL[4], respectively. Typically, an inversion signal of the positive logic selection signal SEL[x] is the negative logic selection signal SEL[xB].

Each of the positive logic selection signal lines 140[1], 140[2], 140[3], and 140[4], and the negative logic selection signal lines 140[1B], 140[2B], 140[3B], and 140[4B] includes a main line part 141 that extends in the first direction X and a branch line part 142 that extends from the main line part 141 in the second direction Y and is electrically coupled to a gate electrode of the transmission gates 152[1], 152[2], 152[3], and 152[4]. The data signal line 160 includes a first wiring line part 161 that corresponds to each block and a plurality of second wiring line parts 162 that are branched from the first wiring line part 161 and extend in the second direction Y toward the respective transmission gates 152. In the present exemplary embodiment, at a position adjacent to the main line part 141 of the selection signal line 140 in the second direction Y, the short-circuiting wiring line 163 that short-circuits the plurality of second wiring line parts 162 with each other extends in the first direction.

The transmission gate 152 includes a first conductive-type transistor including a gate electrode supplied with a positive logic selection signal and a second conductive-type transistor including a gate electrode supplied with a negative logic selection signal. The first conductive-type transistor and the second conductive-type transistor are electrically coupled in parallel.

Here, one of the first conductive-type transistor and the second conductive-type transistor is an n-channel type transistor, and the other is a p-channel transistor. In the present exemplary embodiment, a case where the first conductive-type transistor is an n-channel type transistor 15n and the second conductive-type transistor is a p-channel type transistor 15p is given as an example.

4. Operation

Figure 4:
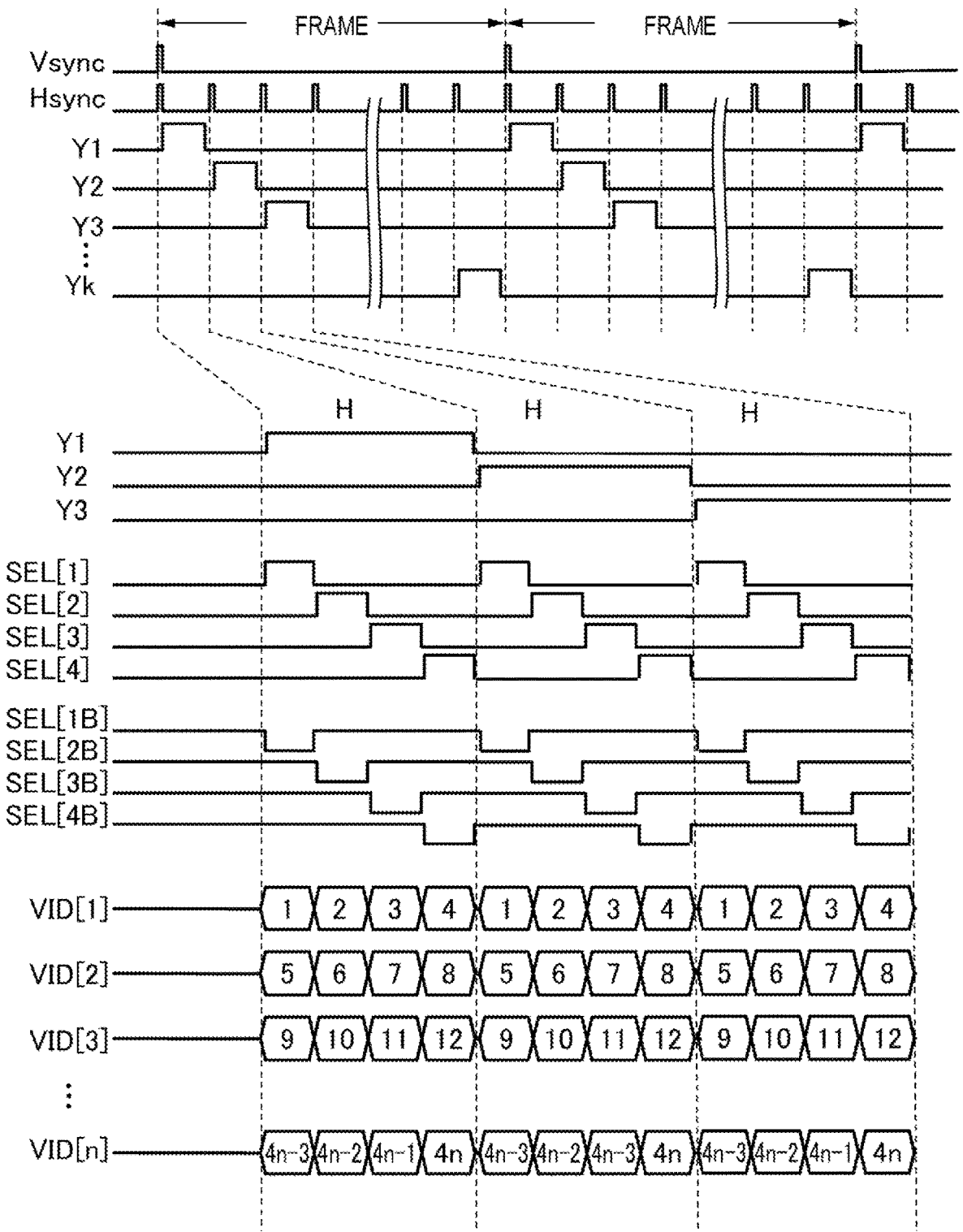
FIG. 4 is a timing chart illustrating an operation example of the electro-optical device illustrated in FIG. 1.

FIG. 4 is a timing chart illustrating an operation example of the electro-optical device 1 illustrated in FIG. 1. FIG. 4 illustrates a horizontal synchronization signal Hsync, the scanning signals Y1, Y2, Y3, . . . , and Yk, the selection signals SEL corresponding to timings at which the scanning signals Y1, Y2, Y3, . . . , and Yk are at a high level, and the data signals VID. The data signals VID are obtained by performing time division multiplex for data written in the corresponding four pixels 111. Therefore, the transmission gate 152 is in an on or off state, based on the selection signal SEL, and thus a predetermined data signal VID is supplied to the corresponding data line 114. For example, while the positive logic selection signal SEL[1] is at a high level, the negative logic selection signal SEL[1B] is at a low level. At this timing, the transmission gate 152[1] illustrated in FIG. 3 is in an on state. Thus, the data line 114 in the [4j−3]-th row is supplied with an image signal S[4j−3] included in the data signal VID[1]. Further, while the positive logic selection signal SEL[2] is at a high level, the negative logic selection signal SEL[2B] is at a low level. At this timing, the transmission gate 152[2] illustrated in FIG. 3 is in an on state. Thus, the data line 114 in the [4j−2]-th row is supplied with the data signal VID[4j−2].

Note that, in the electro-optical device 1, all the data lines 114 are supplied with a pre-charge voltage via the data line selection circuit 150 for each horizontal scanning period H, and then are supplied with the data signals VID, in some cases. Further, in some cases, the electro-optical device 1 adopts a driving method of inverting the polarity of the data signals VID for each frame.

5. Configuration of Transmission Gate 152

Figure 5:
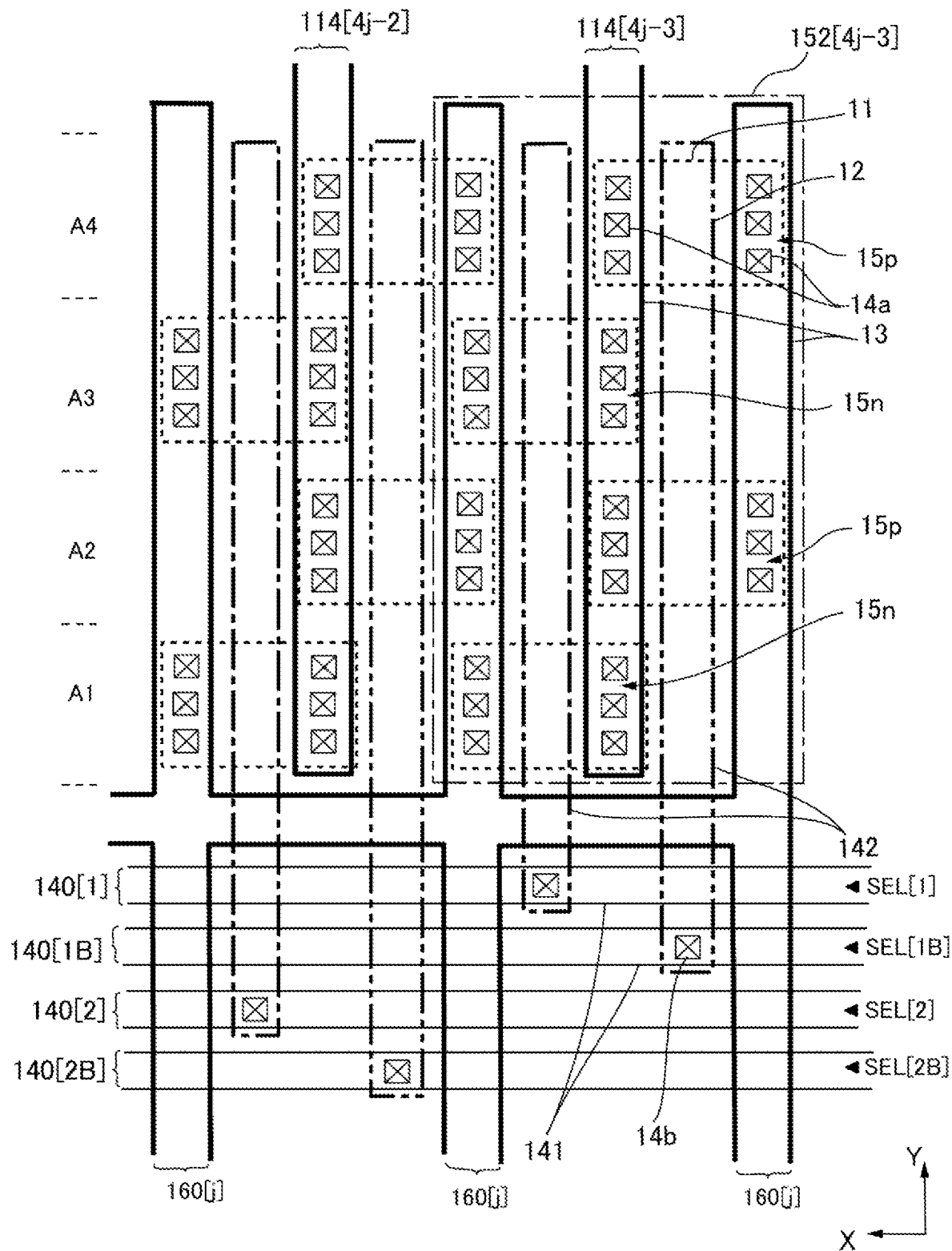
FIG. 5 is an explanatory view of a transmission gate illustrated in FIG. 4.
Figure 6:
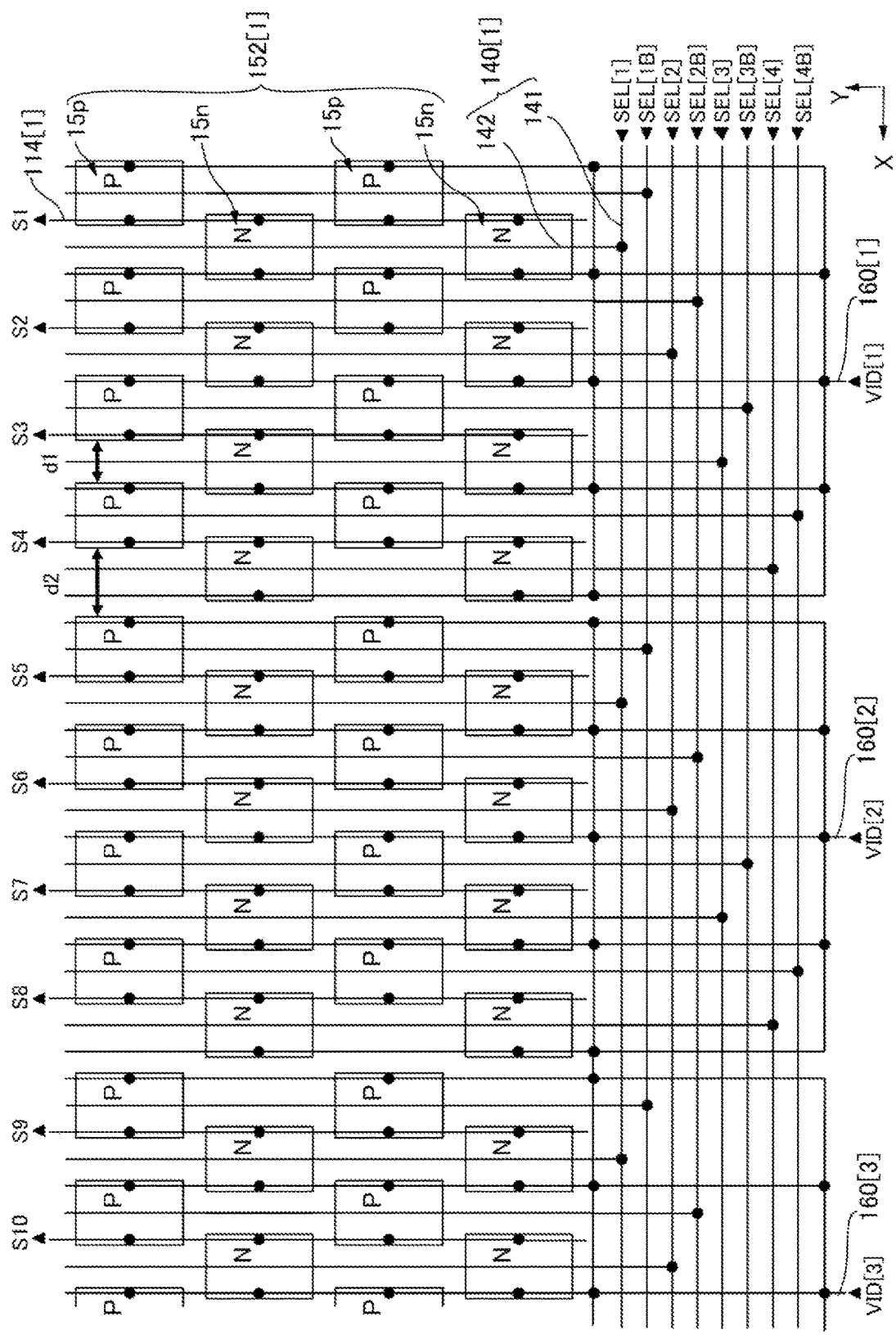
FIG. 6 is an explanatory view of a layout of the transmission gates illustrated in FIG. 4.
Figure 7:
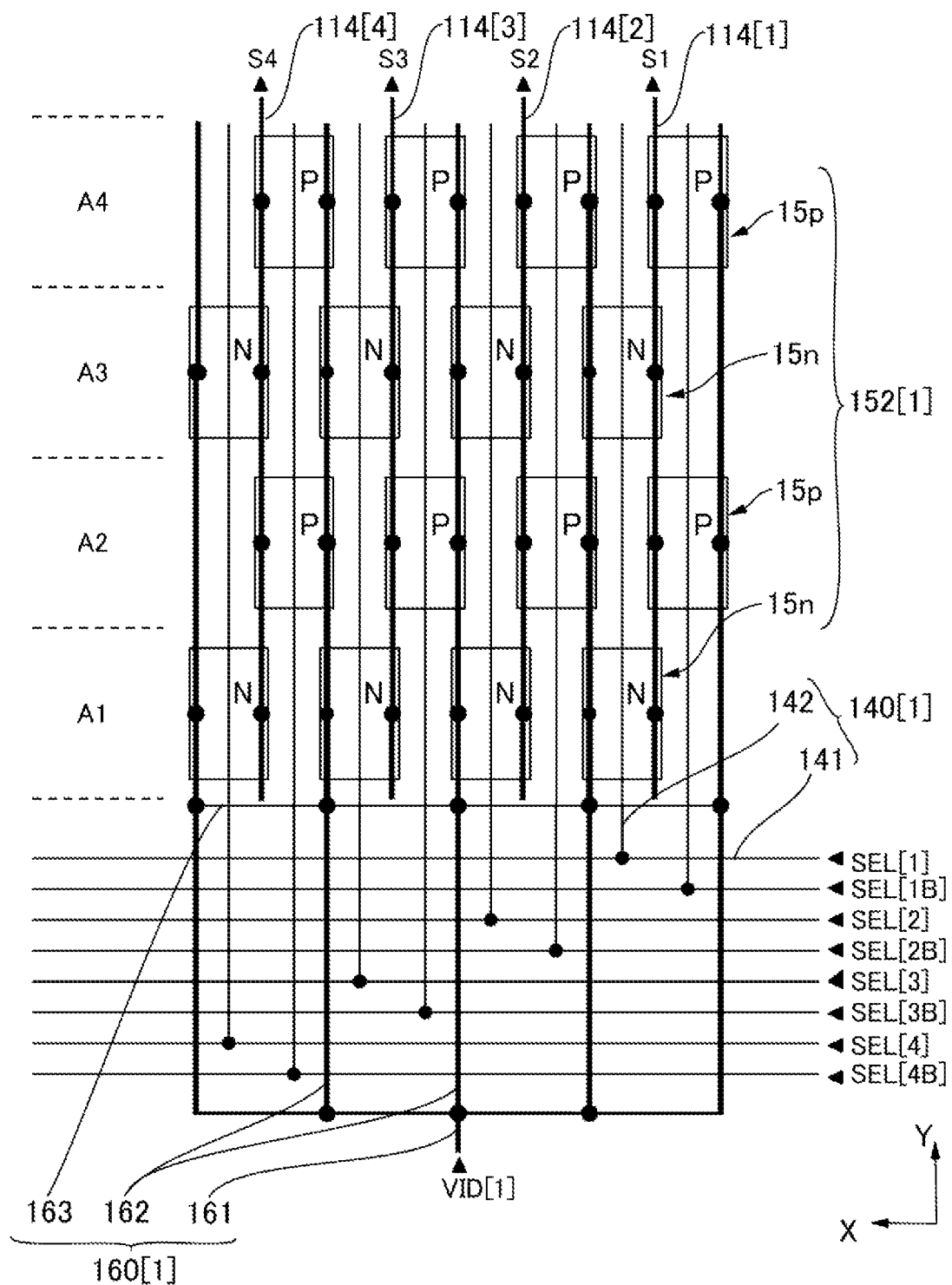
FIG. 7 is an explanatory view of a layout of transistors illustrated in FIG. 6.

FIG. 5 is an explanatory view of the transmission gate 152 illustrated in FIG. 4, and illustrates one example of a planar configuration of the CMOS circuit used in the transmission gate 152. FIG. 6 is an explanatory view of a layout of the transmission gates 152 illustrated in FIG. 4. FIG. 7 is an explanatory view of a layout of transistors illustrated in FIG. 6. Note that, in FIG. 6 and FIG. 7, the re-channel type transistor 15n is indicated with a rectangle denoted with "N", the p-channel type transistor 15p is indicated with a rectangle denoted with "P", and electrical coupling between the transistor and the wiring line is simply indicated with a black circle for easy description.

As illustrated in FIG. 5, in the transmission gate 152, the n-channel type transistor 15n (the first conductive-type transistor) and the p-channel type transistor 15p (the second conductive-type transistor) are TFTs. Therefore, the n-channel type transistor 15n and the p-channel type transistor 15p each include a semiconductor layer 11. A part of the branch line part 142 of the selection signal lines 140, which serves as a gate electrode 12, overlaps the semiconductor layer 11 through intermediation of a gate insulation layer (not illustrated). Each of the data line 114 and the data signal line 160 is electrically coupled to a source area and a drain area of the semiconductor layer 11 through contact holes 14a. In the selection signal line 140, the main line part 141 and the branch line part 142 are formed at different layers, and the main line part 141 and the branch line part 142 are electrically coupled to each other through a contact hole 14b. Further, at least a part of the data signal line 160, which intersects the selection signal line 140, is provided at a layer different from the selection signal line 140. More specifically, the branch line part 142 is formed at a lower layer with respect to a wiring layer 13 at which the data signal line 160 and the data line 114 are formed, and the main line part 141 is formed at an upper layer with respect to the wiring layer 13 at which the data signal line 160 and the data line 114 are formed. Therefore, the contact hole 14b has, for example, a stack contact structure, and the main line part 141 and the branch line part 142 are coupled to each other via the wiring layer 13. It is needless to say that the contact hole 14b may not have a stack contact structure.

As illustrated in FIG. 6 and FIG. 7, in the present exemplary embodiment, the transmission gate 152 includes at least two n-channel type transistors 15n and a p-channel type transistor 15p. The at least two n-channel type transistors 15n and the p-channel type transistor 15p are arranged along the second direction Y in which the branch line part 142 extends. Here, the p-channel type transistor 15p is arranged between the two n-channel type transistors 15n when viewed in the first direction X.

In the present exemplary embodiment, similarly to the n-channel type transistors 15n, a plurality of p-channel type transistors 15p are provided. The n-channel type transistors 15n and the p-channel type transistors 15p are alternately arranged when viewed in the first direction X. Further, the same number of the n-channel type transistors 15n and the p-channel type transistor 15p are provided. More specifically, two n-channel type transistors 15n and two p-channel type transistors 15p are provided. Therefore, when areas along the second direction Y from the main line part 141 are sequentially indicated with a first area A1, a second area A2, a third area A3, and a fourth area A4, the n-channel type transistor 15n is arranged in each of the first area A1 and the third area A3, and the p-channel type transistor 15p is arranged in each of the second area A2 and the fourth area A4. Therefore, in the transmission gate 152, along the second direction Y from the side on which the main line part 141 is positioned, the re-channel type transistor 15n, the p-channel type transistor 15p, the n-channel type transistor 15n, and the p-channel type transistor 15p are arranged in the stated order. Further, the two transmission gates 152 adjacent to each other in the first direction X have the same alignment order of the conductive types of the transistors in the second direction Y.

Further, the n-channel type transistor 15n and the p-channel type transistor 15p are arranged at positions deviated in the first direction X when viewed in the second direction Y. Thus, the branch line part 142 of each of the positive logic selection signal lines 140[1], 140[2], 140[3], and 140[4] and the branch line part 142 of each of the negative logic selection signal lines 140[1B], 140[2B], 140[3B], and 140[4B] extend linearly in the second direction Y in parallel to each other. Further, the data line 114 and the second wiring line parts 162 of the data signal line 160 extend linearly in the second direction Y. Note that the second wiring line parts 162 of the data signal line 160 are arranged in parallel to the branch line part 142 from a coupling part between the main line part 141 and the branch line part 142 to the first area A1. With this configuration, a difference between an inter-wiring line capacitance between the branch line parts 142 of the positive logic selection signal lines 140[1], 140[2], 140[3], and 140[4] and the second wiring line parts 162 of the data signal line 160 and an inter-wiring line capacitance between the branch line parts 142 of the negative logic selection signal lines 140[1B], 140[2B], 140[3B], and 140[4B] and the second wiring line parts 162 of the data signal line 160 is small. Moreover, the branch line parts 142 of the positive logic selection signal lines 140[1], 140[2], 140[3], and 140[4] extend in such a way as to have substantially the same length as the branch line parts 142 of the negative logic selection signal lines 140 to the p-channel type transistors 15p in the fourth area A4 beyond the third area A3. With this configuration, a difference between a parasitic capacitance relating to the branch line parts 142 of the positive logic selection signal lines 140[1], 140[2], 140[3], and 140[4] and a parasitic capacitance relating to the branch line parts 142 of the negative logic selection signal lines 140[1B], 140[2B], 140[3B], and 140[4B] is small. Similarly, the data signal line 160 is arranged beyond the third area A3 to the p-channel type transistor 15*p* in the fourth area. With this configuration, a difference between a parasitic capacitance relating to the branch line parts 142 of the positive logic selection signal lines 140[1], 140[2], 140[3], and 140[4] and a parasitic capacitance relating to the branch line parts 142 of the negative logic selection signal lines 140[1B], 140[2B], 140[3B], and 140[4B] is small.

As described above, in the present exemplary embodiment, any one of the plurality of transmission gates 152 includes the at least two n-channel type transistors 15*n* and the p-channel type transistor 15*p*, and the p-channel type transistor 15*p* is arranged between the two n-channel type transistors 15*n* when viewed in the first direction X. For example, in the present exemplary embodiment, the n-channel type transistors 15*n* and the p-channel type transistors 15*p* are alternately arranged in the second direction Y. Therefore, in the transmission gate 152 in the present exemplary embodiment, a ratio between a wiring line length of the branch line part 142 for controlling the n-channel type transistor 15*n* and a wiring line length of the branch line part 142 for controlling the p-channel type transistor 15*p* can be close to 1, as compared to a transmission gate in a comparative example in which the n-channel type transistor 15*n* and the p-channel type transistor 15*p* are arranged only in the first area A1 and the second area A2. Specifically, as described below, when the ratios between the wiring line lengths are compared, the ratio of the wiring line in the present exemplary embodiment is closer to 1.

The ratio of the wiring line lengths in the present exemplary embodiment=(L2+L4)/(L1+L3)

The ratio of the wiring line lengths in the comparative example=L2/L1

L1=the wiring line length of the branch line part 142 for controlling the n-channel type transistor 15*n* in the first area A1

L2=the wiring line length of the branch line part 142 for controlling the p-channel type transistor 15*p* in the second area A2

L3=the wiring line length of the branch line part 142 for controlling the n-channel type transistor 15*n* in the third area A3

L4=the wiring line length of the branch line part 142 for controlling the p-channel type transistor 15*p* in the fourth area A4

Thus, in the present exemplary embodiment, the ratio of the wiring line lengths of the branch line part 142 for the positive logic selection signal SEL and the branch line part 142 for the negative logic selection signal SEL can be closer to 1 than that in the comparative example. Thus, a ratio of parasitic resistances and a ratio of parasitic capacitances of the branch line part 142 for the positive logic selection signal SEL and the branch line part 142 for the negative logic selection signal SEL can be close to 1. Here, a driving load of the selection signal SEL is dominant in the branch line part 142. According to the present exemplary embodiment, a difference between the parasitic capacitances generated due to adjacent wiring lines and wiring line intersection in the branch line parts 142 can be reduced. Thus, a difference in dullness of the waveforms of the positive logic selection signal SEL and the negative logic selection signal SEL can be small. The difference in dullness of the waveforms is small, and hence a balance of a feed-through voltage from the input side to the terminal end side of the main line part 141 (in other words, with respect to the entire data line) is less likely to be lost. Thus, in the entire display region, the common voltage LCCOM can be set as appropriate. Further, the n-channel type transistors 15*n* and the p-channel type transistors 15*p* are alternately arranged in a divided manner in the branch line parts 142, and thus a wiring resistance and a capacitance load of the branch line parts 142 are dispersed. Therefore, the positive logic selection signal SEL and the negative logic selection signal SEL of the branch line parts 142 are time constants close to each other. Specifically, with respect to the positive logic selection signal SEL and the negative logic selection signal SEL, a balance of the feed-through voltage from the input side of the branch line part 142 to the terminal end side of the branch line part 142 is less likely to be lost. Thus, the common voltage LCCOM can be set as appropriate. In other words, the feed-through voltage from the transmission gate 152 is prevented from being deviated largely to a plus side or a minus side from the common voltage LCCOM as a reference. The feed-through voltage is prevented from being increased. Thus, variable ranges for a data signal from an external circuit and the common voltage LCCOM can be small, and increase in circuit scale and power consumption can be avoided.

Exemplary Embodiment 2

Figure 8:
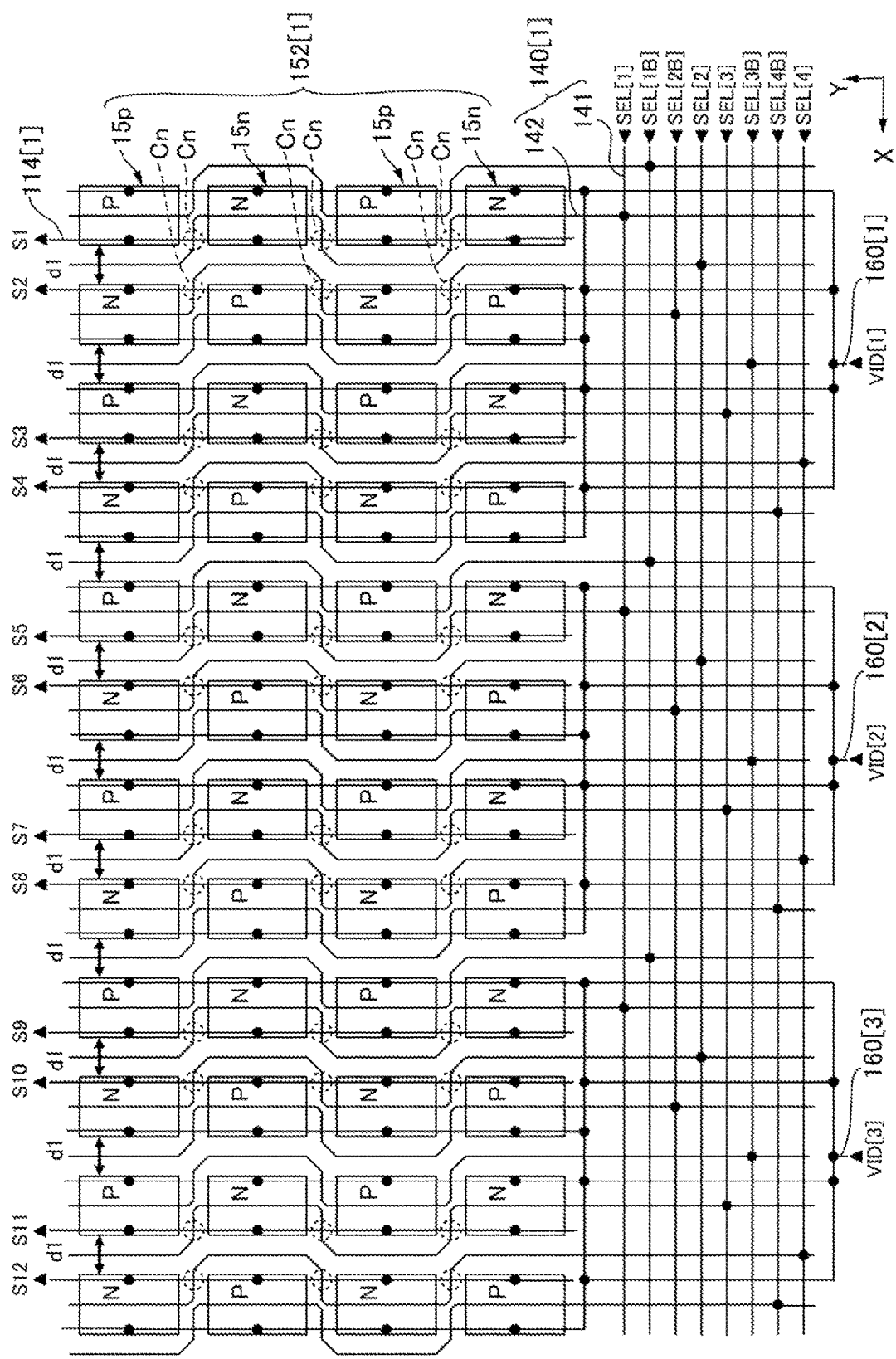
FIG. 8 is an explanatory view of an electro-optical device according to Exemplary Embodiment 2 of the present disclosure.
Figure 9:
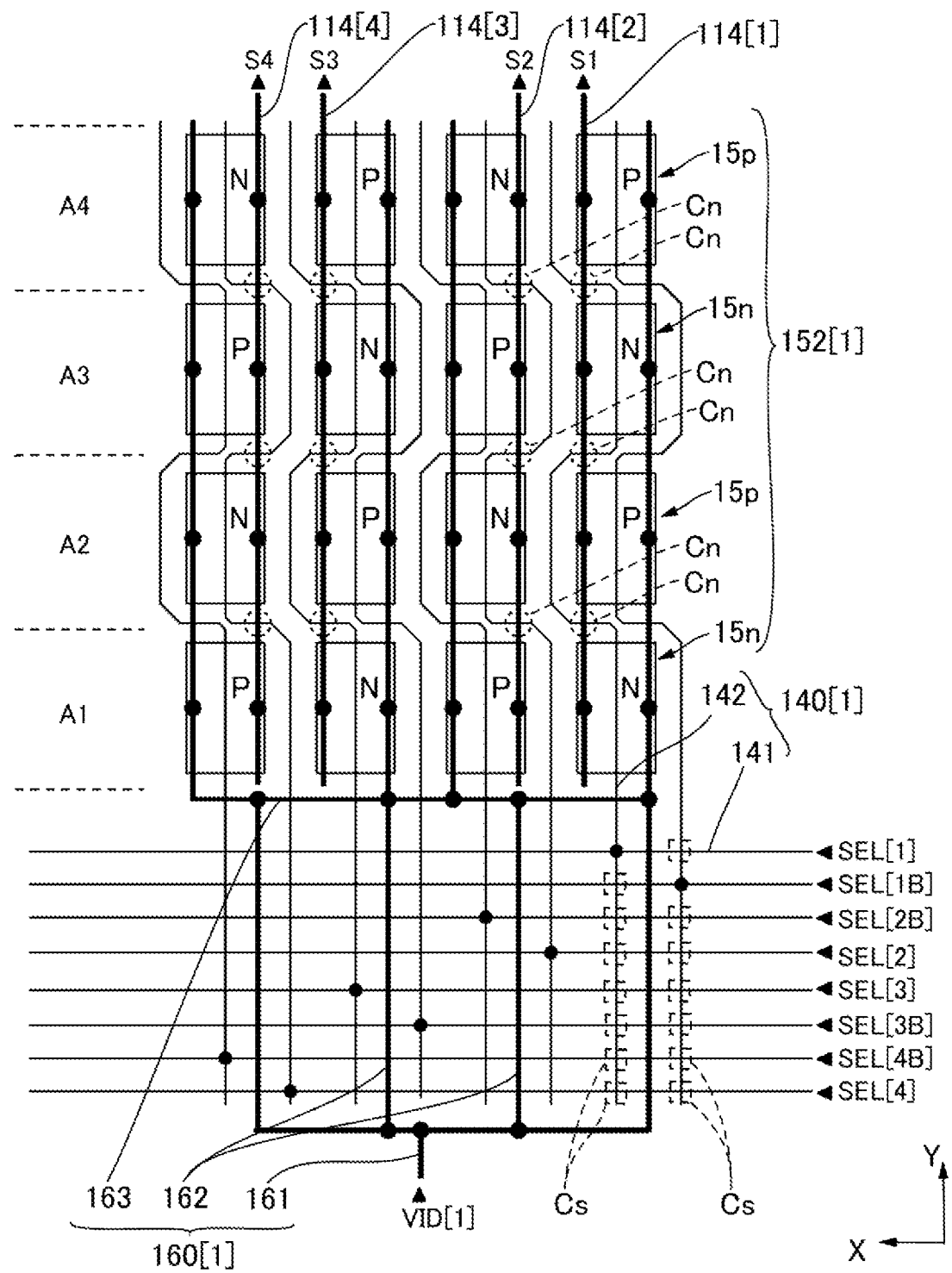
FIG. 9 is an explanatory view illustrating a layout of transistors illustrated in FIG. 8.

FIG. 8 is an explanatory view of the electro-optical device 1 according to Exemplary Embodiment 2 of the present disclosure, and FIG. 8 illustrates a layout of the transmission gates 152. FIG. 9 is an explanatory view illustrating a layout of transistors illustrated in FIG. 8. Basic configurations of the present exemplary embodiment and of exemplary embodiments described below are the same as the configuration of Exemplary Embodiment 1, and thus, common portions are denoted by the same reference signs, and description thereof is omitted. Further, in FIG. 8, FIG. 9, and the drawings described later, the re-channel type transistor 15*n* is indicated with a rectangle denoted with "N", and the p-channel type transistor 15*p* is indicated with a rectangle denoted with "P".

As illustrated in FIG. 8 and FIG. 9, in the present exemplary embodiment, the n-channel type transistors 15*n* and the p-channel type transistors 15*p* are alternately arranged when viewed in the first direction X, similarly in Exemplary Embodiment 1.

Here, in Exemplary Embodiment 1, as illustrated in FIG. 6, the n-channel type transistor 15*n* and the p-channel type transistor 15*p* are arranged at positions deviated in the first direction X when viewed in the second direction Y. Thus, as illustrated in FIG. 6, an interval between the transistors adjacent to each other in the first direction X in the block is d1, and an interval between the transistors belonging to the blocks adjacent to each other in the first direction X is d2, which is larger than the interval d1 between the transistors in the block. This is because there is a part in which two wiring lines are arranged between semiconductor films constituting a transistor at a block boundary. With respect to this, in the present exemplary embodiment, as illustrated in FIG. 8 and FIG. 9, both an interval between the transistors adjacent to each other in the first direction X in the block and an interval between the transistors belonging to the blocks adjacent to each other in the first direction X are d1. This is because one wiring line is only required to be arranged between semiconductor film constituting a transistor at a block boundary. For example, the semiconductor layers constituting the transistors may be arranged at an equal interval in the first direction X. Thus, simplification of the layout of the transistors and efficient arrangement can be achieved.

In order to achieve this configuration, in the present exemplary embodiment, the two n-channel type transistors 15n and the two p-channel type transistors 15p that are alternately arranged along the second direction Y are arranged linearly along the second direction Y. Thus, the n-channel type transistor 15n and the p-channel type transistor 15p are arranged at the same positions in the first direction X when viewed in the second direction Y. In correspondence with this layout, the branch line part 142 of each of the positive logic selection signal lines 140[1], 140[2], 140[3], and 140[4] and the branch line part 142 of each of the negative logic selection signal lines 140[1B], 140[2B], 140[3B], and 140[4B] are bent midway portions in the second direction Y in such a way as to avoid mutual intersections, and extend in the second direction Y. More specifically, the branch line part 142 is bent in the first direction X between the first area A1 and the second area A2, is bent in a direction opposite to the first direction X between the second area A2 and the third area A3, and is bent in the first direction X between the third area A3 and the fourth area A4.

Here, the transmission gates 152 adjacent to each other in the first direction X have the opposite orders of the conductive types of the transistors aligned along the second direction Y. For example, in an odd-numbered transmission gate 152 in the first direction X, the n-channel type transistor 15n, the p-channel type transistor 15p, the n-channel type transistor 15n, and the p-channel type transistor 15p are arranged in the stated order along the second direction Y. With respect to this, in an even-numbered transmission gate 152 in the first direction X, the p-channel type transistor 15p, the n-channel type transistor 15n, the p-channel type transistor 15p, and the n-channel type transistor 15n are arranged in the stated order along the second direction Y. Thus, in the present exemplary embodiment, as indicated with dotted-line circles Cn in FIG. 9, the branch line parts 142 intersecting the data lines 114 are the branch line parts 142 of the positive logic selection signal lines 140[1], 140[2], 140[3], and 140[4], and the branch line parts 142 of the negative logic selection signal lines 140[1B], 140[2B], 140[3B], and 140[4B] do not intersect the data lines 114. Therefore, for all the transmission gates 152, the feed-through voltage is unified in such a way that an influence of the positive logic selection signal is larger than an influence of the negative logic selection signal. Specifically, for all the transmission gates 152, orientation of the feed-through voltage can be unified with the common voltage LCCOM as a reference. Thus, for example, there is no need to correct a data signal in accordance with the odd-numbered transmission gate 152 and the even-numbered transmission gate 152. As a result, vertical line irregularity or the like is less likely to be caused, and satisfactory display can be achieved. Note that examples for improving an influence of a parasitic capacitance at the wiring line intersection part indicated with the dotted-line circle Cn are described later.

Moreover, in the present exemplary embodiment, in the positive logic selection signal lines 140[1], 140[2], 140[3], and 140[4] and the negative logic selection signal lines 140[1B], 140[2B], 140[3B], and 140[4B], the branch line parts 142 extend in a direction opposite to the second direction Y from the main line parts 141 that are electrically coupled to the branch line parts 142 themselves. Thus, as indicated with dotted-line squares Cs in FIG. 9, any of the branch line parts 142 intersect with the five main line parts 141 other than the main line parts 141 that are electrically coupled to the branch line parts 142 themselves. Therefore, in any of the selection signal lines 140, parasitic capacitances caused by intersection with the other selection signal lines 140 can be equivalent. Further, the second wiring line parts 162 of the data signal line 160 are arranged in parallel to the respective branch line parts 142. Thus, a value of the inter-wiring line capacitance of the branch line part 142 and a value of the inter-wiring line capacitance of the second wiring line part 162 of the data signal line 160 to the first area A1 are close to each other. Therefore, in the branch line part 142, the feed-through voltage of the positive logic selection signal and the feed-through voltage of the negative logic selection signal are satisfactorily canceled with each other. The rest of the configuration is similar to that of Exemplary Embodiment 1.

Modified Example 1 of Exemplary Embodiment 2

Figure 10:
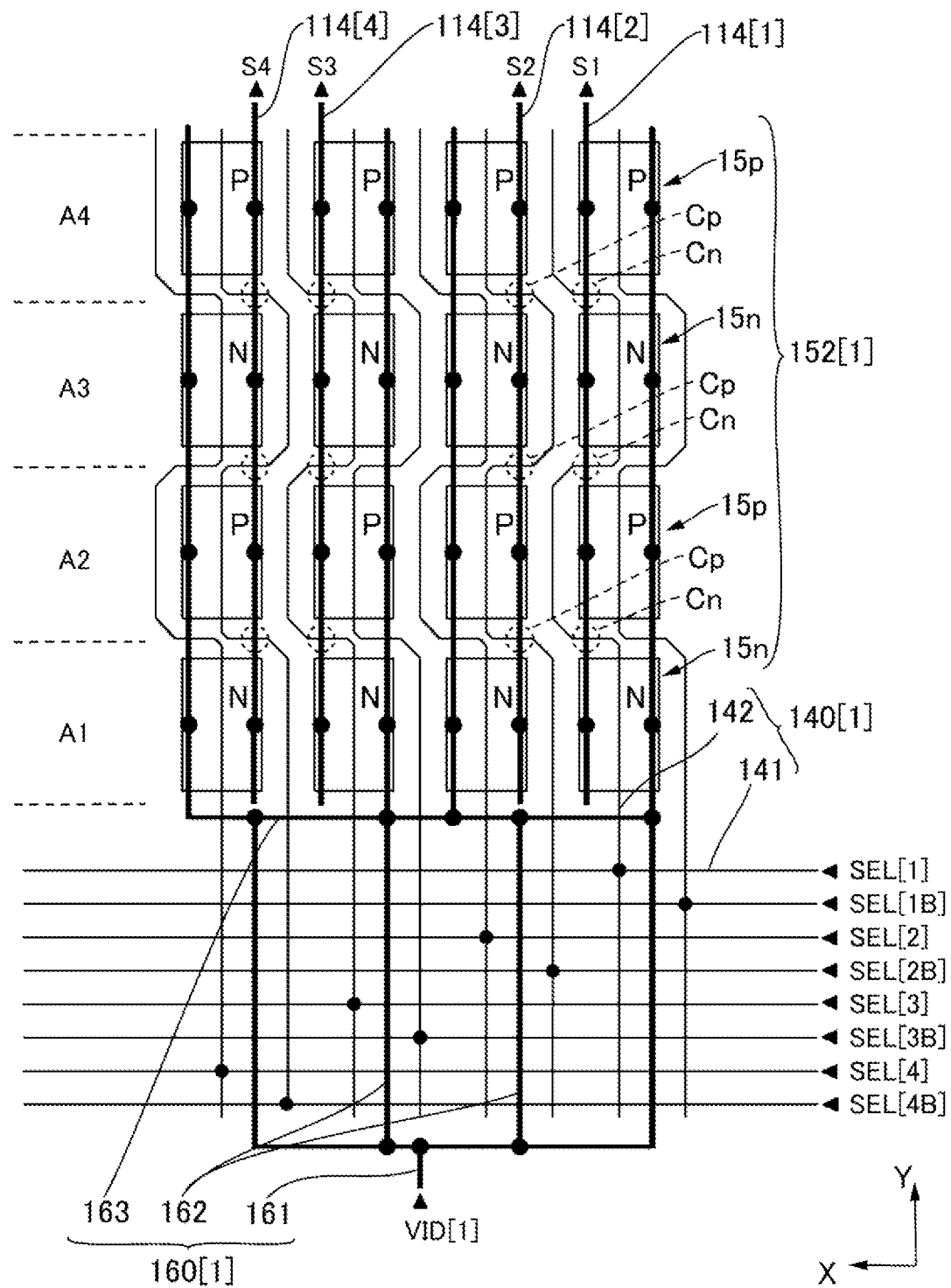
FIG. 10 is an explanatory view of an electro-optical device according to Modified Example 1 of Exemplary Embodiment 2 of the present disclosure.

FIG. 10 is an explanatory view of the electro-optical device 1 according to Modified Example 1 of Exemplary Embodiment 2 of the present disclosure, and FIG. 10 illustrates a layout of transistors in the transmission gate 152.

As illustrated in FIG. 10, in the present exemplary embodiment, the two n-channel type transistors 15n and the two p-channel type transistors 15p that are alternately arranged along the second direction Y are arranged linearly along the second direction Y, similarly in Exemplary Embodiment 2. Therefore, the n-channel type transistor 15n and the p-channel type transistor 15p are arranged at the same positions in the first direction X when viewed in the second direction Y. Therefore, the branch line part 142 of each of the positive logic selection signal lines 140[1], 140[2], 140[3], and 140[4] and the branch line part 142 of each of the negative logic selection signal lines 140[1B], 140[2B], 140[3B], and 140[4B] are bent in midway portions in the second direction Y in such a way as to avoid mutual intersections, and extend in the second direction Y.

In the present exemplary embodiment, in any of the plurality of transmission gates 152, the orders of the conductive types of the transistors aligned along the second direction Y are the same. Thus, in the odd-numbered transmission gate 152 in the first direction X, as indicated with the dotted-line circles Cn in FIG. 10, the branch line parts 142 of the positive logic selection signal lines 140[1], 140[2], 140[3], and 140[4] intersect the data lines 114, and the branch line parts 142 of the negative logic selection signal lines 140[1B], 140[2B], 140[3B], and 140[4B] do not intersect the data lines 114. With respect to this, in the even-numbered transmission gate 152 in the first direction X, as indicated with dotted-line circles Cp in FIG. 10, the branch line parts 142 of the negative logic selection signal lines 140[1B], 140[2B], 140[3B], and 140[4B] intersects with the data lines 114, and the branch line parts 142 of the positive logic selection signal lines 140[1], 140[2], 140[3], and 140[4] do not intersect the data lines 114.

In this configuration, similarly in Exemplary Embodiment 1, the n-channel type transistors 15n and the p-channel type transistors 15p are alternately arranged when viewed in the first direction X. Thus, the ratio between the wiring line length of the branch line part 142 for controlling the n-channel type transistor 15n and the wiring line length of the branch line part 142 for controlling the p-channel type transistor 15p can be close to 1. The rest of the configuration is similar to that of Exemplary Embodiment 2.

Modified Example 2 of Exemplary Embodiment 2

Figure 11:
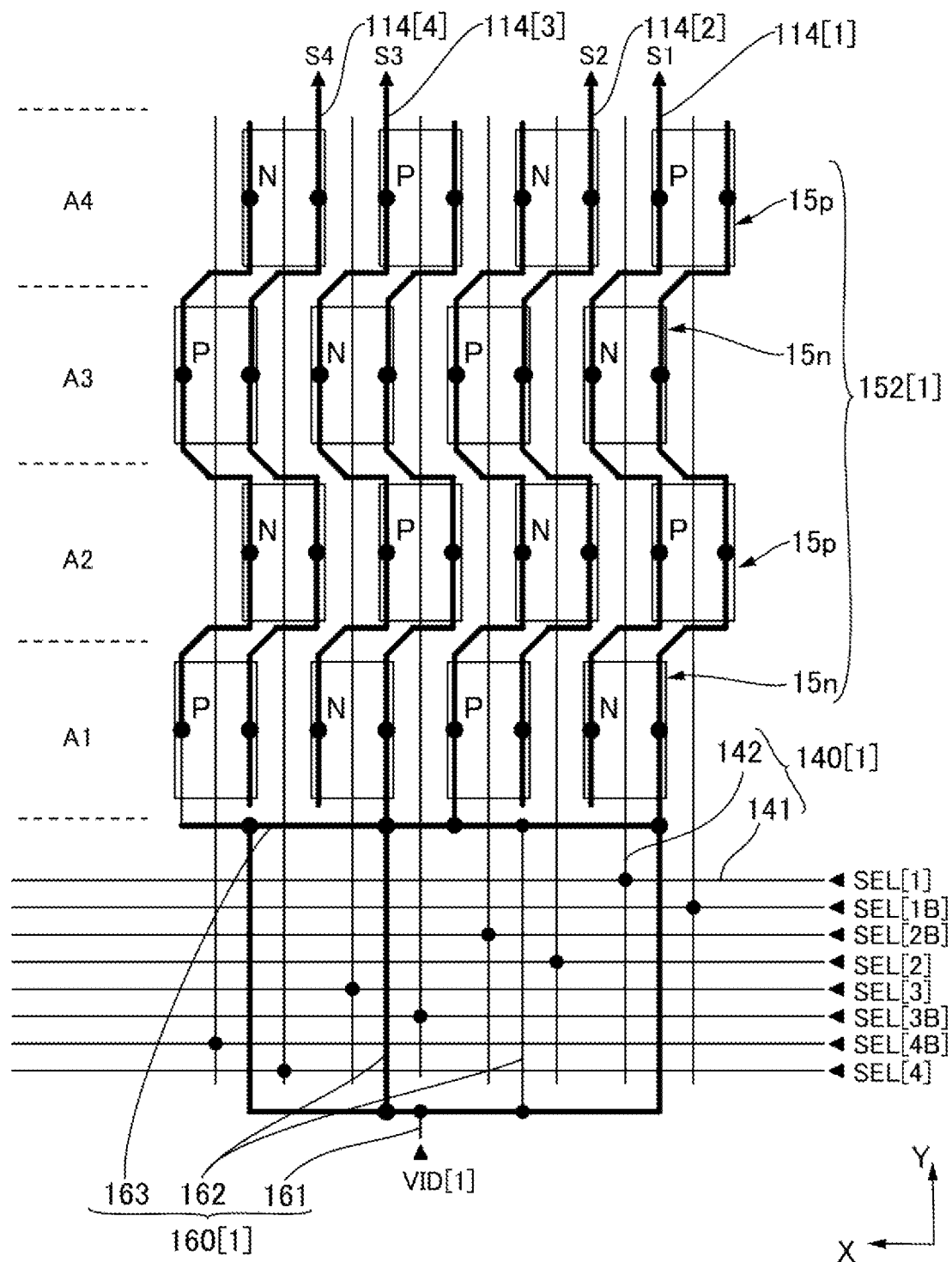
FIG. 11 is an explanatory view of an electro-optical device according to Modified Example 2 of Exemplary Embodiment 2 of the present disclosure.

FIG. 11 is an explanatory view of the electro-optical device 1 according to Modified Example 2 of Exemplary Embodiment 2 of the present disclosure, and FIG. 11 illustrates a layout of the transmission gates 152.

The n-channel type transistors 15n and the p-channel type transistors 15p are alternately arranged. Further, in the present exemplary embodiment, the n-channel type transistor 15n and the p-channel type transistor 15p are deviated in the first direction X when viewed in the second direction Y. Therefore, the branch line part 142 of each of the positive logic selection signal lines 140[1], 140[2], 140[3], and 140[4] and the branch line part 142 of each of the negative logic selection signal lines 140[1B], 140[2B], 140[3B], and 140[4B] extend linearly in the second direction Y. The branch line part 142 is linearly arranged, and hence the wiring length of the branch line part 142 is short. Thus, a parasitic capacitance of the branch line part 142 is reduced, which is suitable for high-speed driving.

Further, the transmission gates 152 adjacent in the first direction X have the opposite orders of the conductive types of the transistors aligned along the second direction Y. For example, in an odd-numbered transmission gate 152 in the first direction X, the n-channel type transistor 15n, the p-channel type transistor 15p, the n-channel type transistor 15n, and the p-channel type transistor 15p are arranged in the stated order along the second direction Y. With respect to this, in an even-numbered transmission gate 152 in the first direction X, the p-channel type transistor 15p, the n-channel type transistor 15n, the p-channel type transistor 15p, and the n-channel type transistor 15n are arranged in the stated order along the second direction Y. Thus, in the present exemplary embodiment, as indicated with dotted-line circles Cn in FIG. 9, the branch line parts 142 intersecting the data lines 114 are the branch line parts 142 of the positive logic selection signal lines 140[1], 140[2], 140[3], and 140[4], and the branch line parts 142 of the negative logic selection signal lines 140[1B], 140[2B], 140[3B], and 140[4B] do not intersect the data lines 114. Therefore, for all the transmission gates 152, the feed-through voltage is unified in such a way that an influence of the positive logic selection signal is larger than an influence of the negative logic selection signal. Specifically, for all the transmission gates 152, orientation of the feed-through voltage can be unified with the common voltage LCCOM as a reference. Thus, for example, there is no need to correct a data signal in accordance with the odd-numbered transmission gate 152 and the even-numbered transmission gate 152. As a result, vertical line irregularity or the like is less likely to be caused, and satisfactory display can be achieved. The rest of the configuration is similar to that of Exemplary Embodiment 2.

Exemplary Embodiment 3

Figure 12:
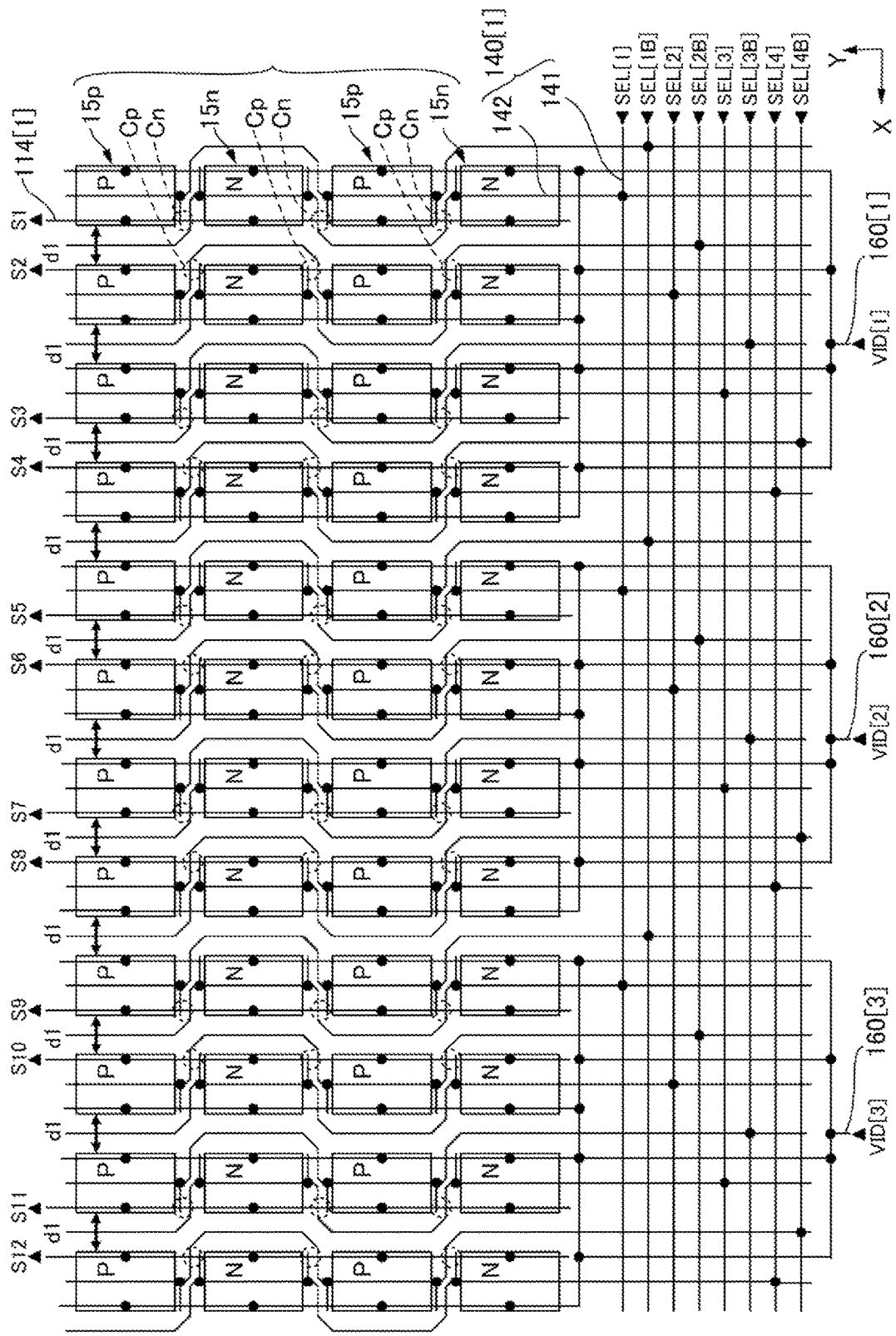
FIG. 12 is an explanatory view of an electro-optical device according to Exemplary Embodiment 3 of the present disclosure.
Figure 13:
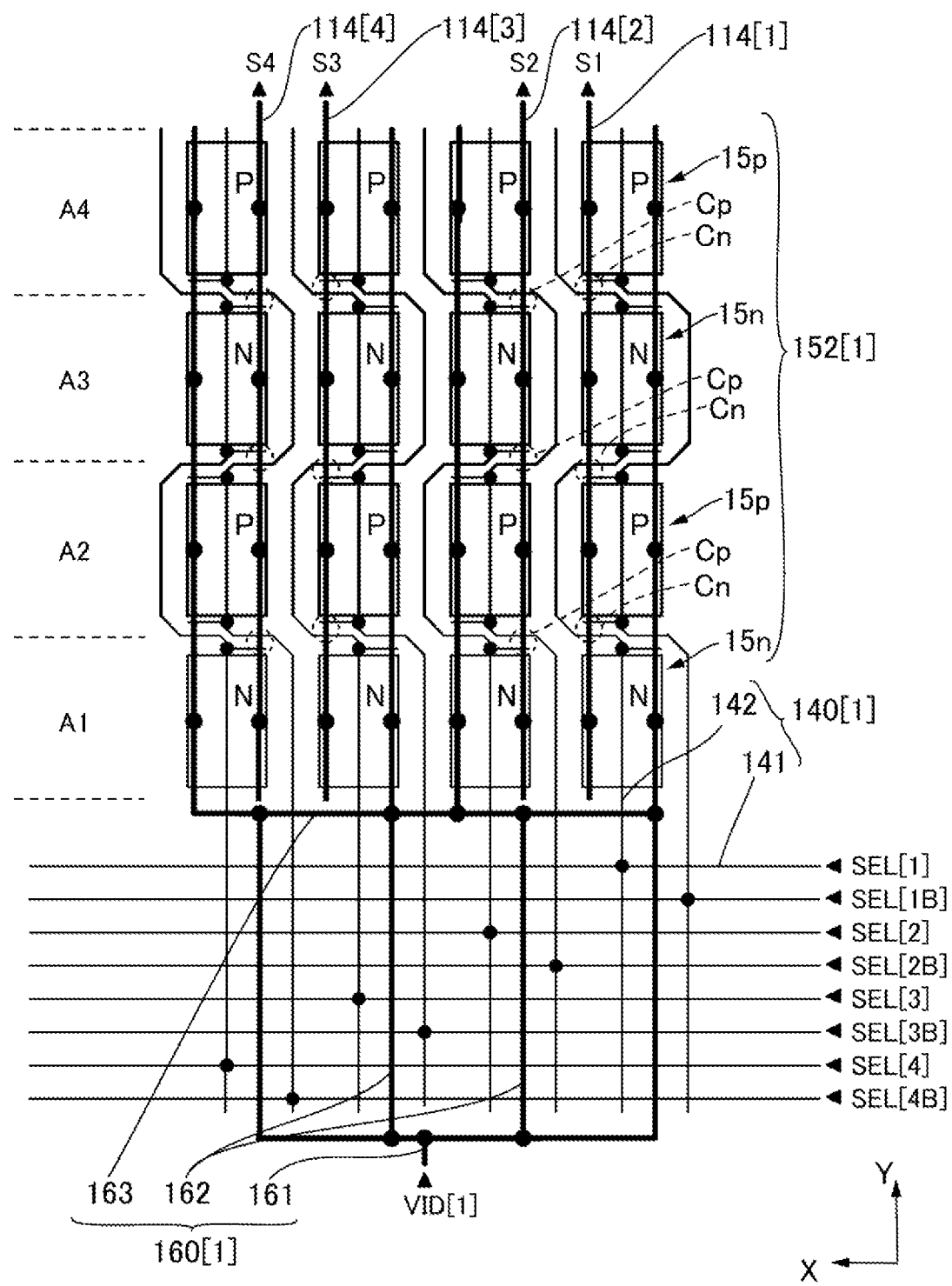
FIG. 13 is an explanatory view illustrating a layout of transistors illustrated in FIG. 12.
Figure 14:
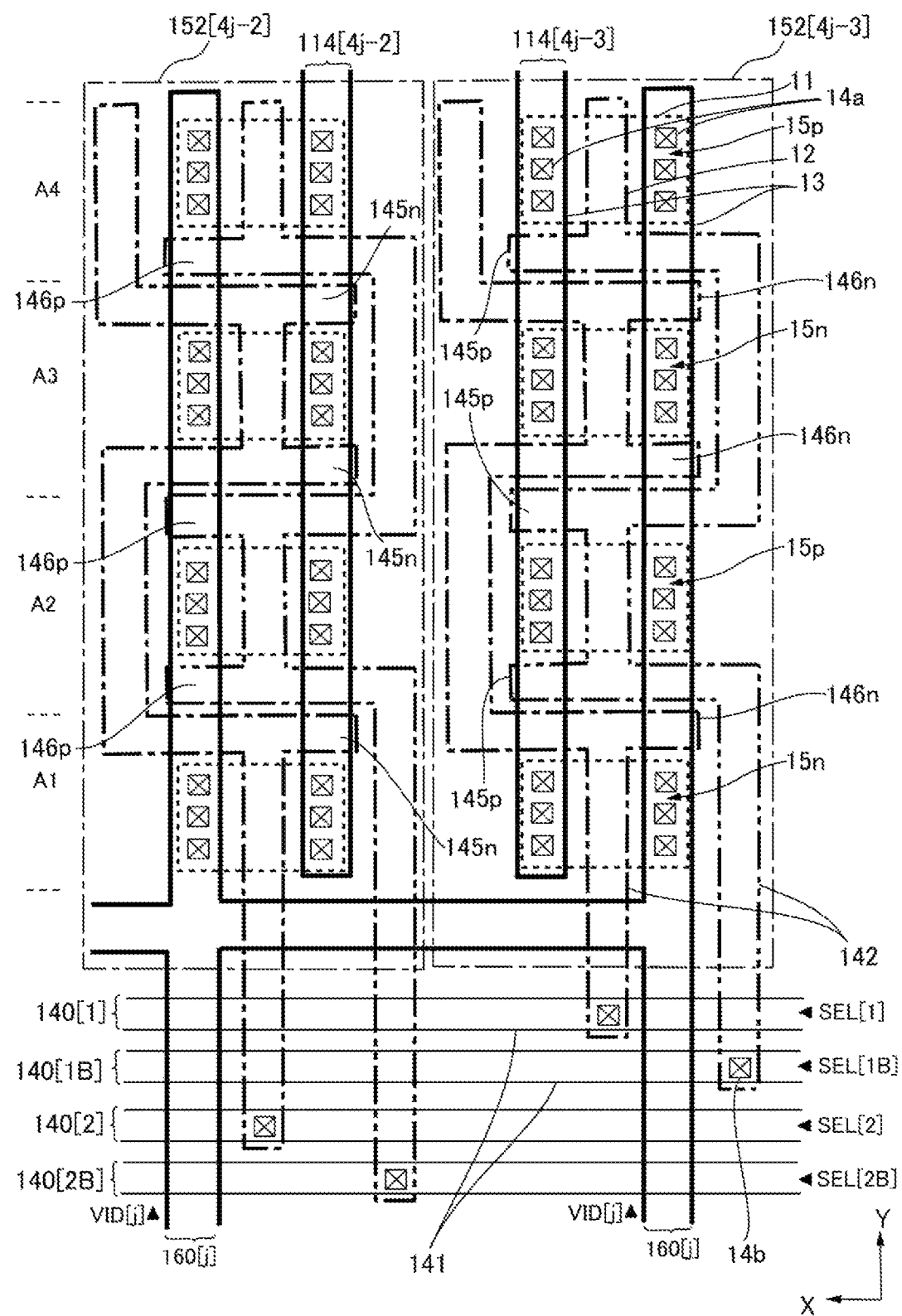
FIG. 14 is an explanatory view illustrating planar configurations of the transistors and the like in FIG. 13.

FIG. 12 is an explanatory view of the electro-optical device 1 according to Exemplary Embodiment 3 of the present disclosure, and FIG. 12 illustrates a layout of the transmission gates 152. FIG. 13 is an explanatory view illustrating a layout of transistors illustrated in FIG. 12. FIG. 14 is an explanatory view illustrating planar configurations of the transistors and the like in FIG. 13.

As illustrated in FIG. 12 and FIG. 13, in the present exemplary embodiment, the n-channel type transistors 15n and the p-channel type transistors 15p are alternately arranged when viewed in the first direction X, similarly in Exemplary Embodiment 1. Further, in the present exemplary embodiment, the n-channel type transistor 15n and the p-channel type transistor 15p are arranged at the same positions in the first direction X when viewed in the second direction Y, similarly in Exemplary Embodiment 2. Therefore, the branch line part 142 of each of the positive logic selection signal lines 140[1], 140[2], 140[3], and 140[4] and the branch line part 142 of each of the negative logic selection signal lines 140[1B], 140[2B], 140[3B], and 140[4B] are bent in midway portions in the second direction Y in such a way as to avoid mutual intersections, and extend in the second direction Y.

In Modified Example 1 of Exemplary Embodiment 2, as indicated with the dotted-line circles Cn in FIG. 10, in the odd-numbered transmission gate 152 in the first direction X, the branch line parts 142 of the positive logic selection signal lines 140[1], 140[2], 140[3], and 140[4] intersect the data lines 114, and the branch line parts 142 of the negative logic selection signal lines 140[1B], 140[2B], 140[3B], and 140[4B] do not intersect the data lines 114. In the present exemplary embodiment, as illustrated in FIG. 14, protrusion portions 145p that protrude in such a way as to intersect the data lines 114 are formed at the branch line parts 142 of the negative logic selection signal lines 140[1B], 140[2B], 140[3B], and 140[4B]. Therefore, in the odd-numbered transmission gate 152, a parasitic capacitance present between the positive logic selection signal lines 140[1], 140[2], 140[3], and 140[4] and the data lines 114 and a parasitic capacitor present between the negative logic selection signal lines 140[1B], 140[2B], 140[3B], and 140[4B] and the data lines 114 are equivalent. Therefore, in the odd-numbered transmission gate 152 in the first direction X, a difference between parasitic capacitances can be reduced in the positive logic selection signal SEL and the negative logic selection signal SEL.

Meanwhile, in Modified Example 1 of Exemplary Embodiment 2, as indicated with the dotted-line circles Cp in FIG. 10, in the even-numbered transmission gate 152 in the first direction X, the branch line parts 142 of the negative logic selection signal lines 140[1B], 140[2B], 140[3B], and 140[4B] intersect the data lines 114, and the branch line parts 142 of the positive logic selection signal lines 140[1], 140[2], 140[3], and 140[4] do not intersect the data lines 114. In the present exemplary embodiment, as illustrated in FIG. 14, protrusion portions 145n that protrude in such a way as to intersect the data lines 114 are formed at the branch line parts 142 of the positive logic selection signal lines 140[1], 140[2], 140[3], and 140[4]. Therefore, similarly in the odd-numbered transmission gate 152, in the even-numbered transmission gate 152, a parasitic capacitance present between the positive logic selection signal lines 140[1], 140[2], 140[3], and 140[4] and the data lines 114 and a parasitic capacitor present between the negative logic selection signal lines 140[1B], 140[2B], 140[3B], and 140[4B] and the data lines 114 are equivalent. Therefore, similarly in the odd-numbered transmission gate 152, in the even-numbered transmission gate 152 in the first direction X, a difference between parasitic capacitances can be reduced in the positive logic selection signal SEL and the negative logic selection signal SEL.

Further, in Modified Example 1 of Exemplary Embodiment 2, as illustrated in FIG. 10, in the odd-numbered transmission gate 152 in the first direction X, the branch line parts 142 of the negative logic selection signal lines 140[1B], 140[2B], 140[3B], and 140[4B] intersect the data signal line 160, and the branch line parts 142 of the positive logic selection signal lines 140[1], 140[2], 140[3], and 140[4] do not intersect the data lines 114. In the present exemplary embodiment, as illustrated in FIG. 14, protrusion portions 146n that protrude in such a way as to intersect the data signal line 160 are formed at the branch line parts 142 of the positive logic selection signal lines 140[1], 140[2], 140[3], and 140[4]. Therefore, in the odd-numbered transmission gate 152, a parasitic capacitance present between the positive logic selection signal lines 140[1], 140[2], 140[3], and 140[4] and the data signal line 160, and a parasitic capacitance present between the negative logic selection signal lines 140[1B], 140[2B], 140[3B], and 140[4B] and the data signal line 160 are equivalent.

Meanwhile, in Modified Example 1 of Exemplary Embodiment 2, as in FIG. 10, in the even-numbered transmission gate 152 in the first direction X, the branch line parts 142 of the positive logic selection signal lines 140[1], 140[2], 140[3], and 140[4] intersect the data signal line 160, and the branch line parts 142 of the negative logic selection signal lines 140[1B], 140[2B], 140[3B], and 140[4B] do not intersect the data signal line 160. In the present exemplary embodiment, as illustrated in FIG. 14, protrusion portions 146p that protrude in such a way as to intersect the data signal lines 160 are formed at the branch line parts 142 of the negative logic selection signal lines 140[1B], 140[2B], 140[3B], and 140[4B]. Therefore, similarly in the odd-numbered transmission gate 152, in the even-numbered transmission gate 152, a parasitic capacitance present between the positive logic selection signal lines 140[1], 140[2], 140[3], and 140[4] and the data signal line 160 and a parasitic capacitance present between the negative logic selection signal lines 140[1B], 140[2B], 140[3B], and 140[4B] and the data signal lines 160 are equivalent.

Exemplary Embodiment 4

Figure 15:
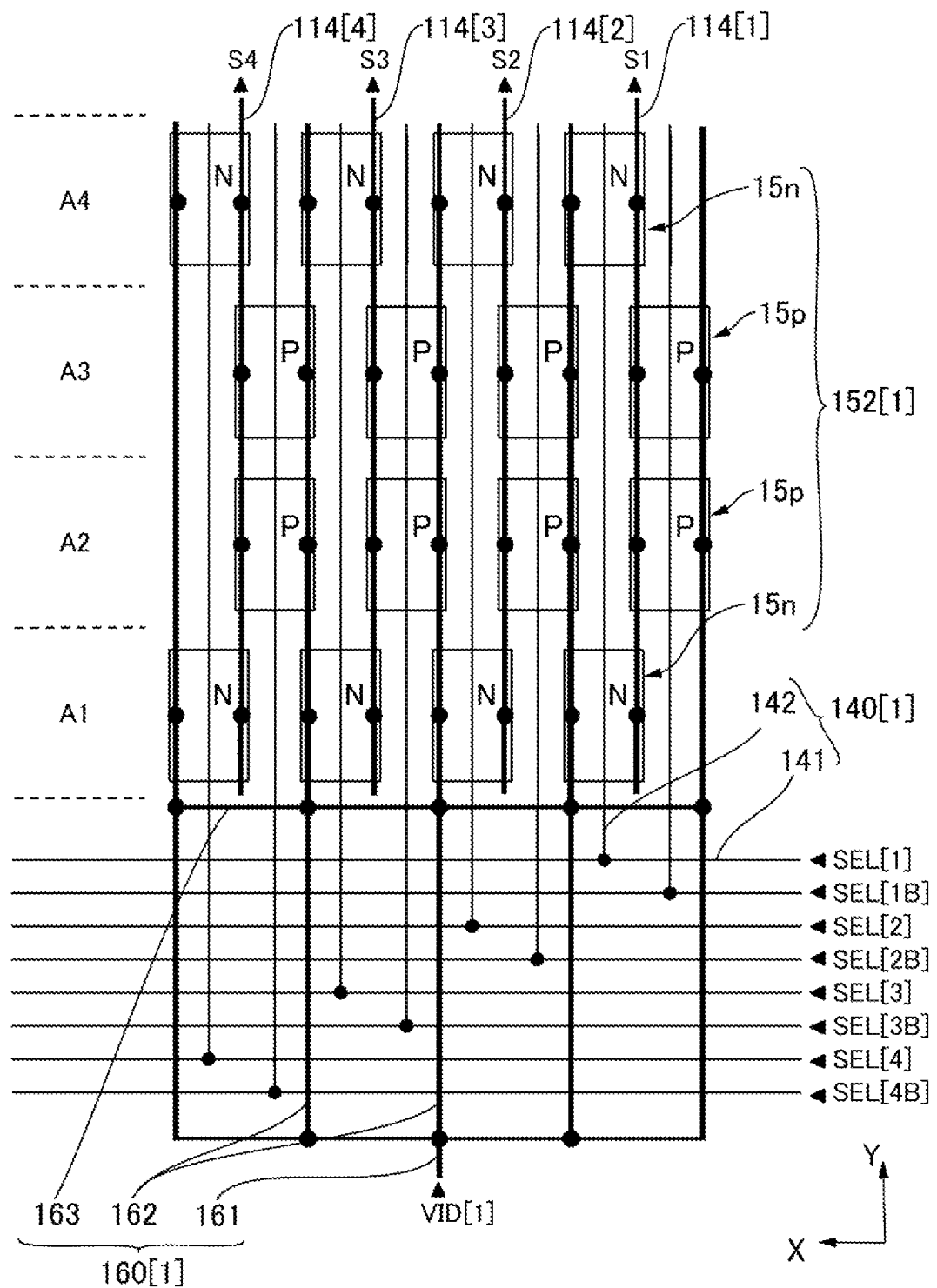
FIG. 15 is an explanatory view of an electro-optical device according to Exemplary Embodiment 4 of the present disclosure.

FIG. 15 is an explanatory view of the electro-optical device 1 according to Exemplary Embodiment 4 of the present disclosure, and illustrates a layout of the transmission gates 152. In the present exemplary embodiment, as illustrated in FIG. 15, when the p-channel type transistor 15p is arranged between the two n-channel type transistors 15n, the two p-channel type transistors 15p are arranged between the two re-channel type transistors 15n. In this configuration, a difference between the parasitic capacitances generated due to adjacent wiring lines and wiring line intersection can also be reduced in the positive logic selection signal SEL and the negative logic selection signal SEL.

Modified Example of Exemplary Embodiment 4

Figure 16:
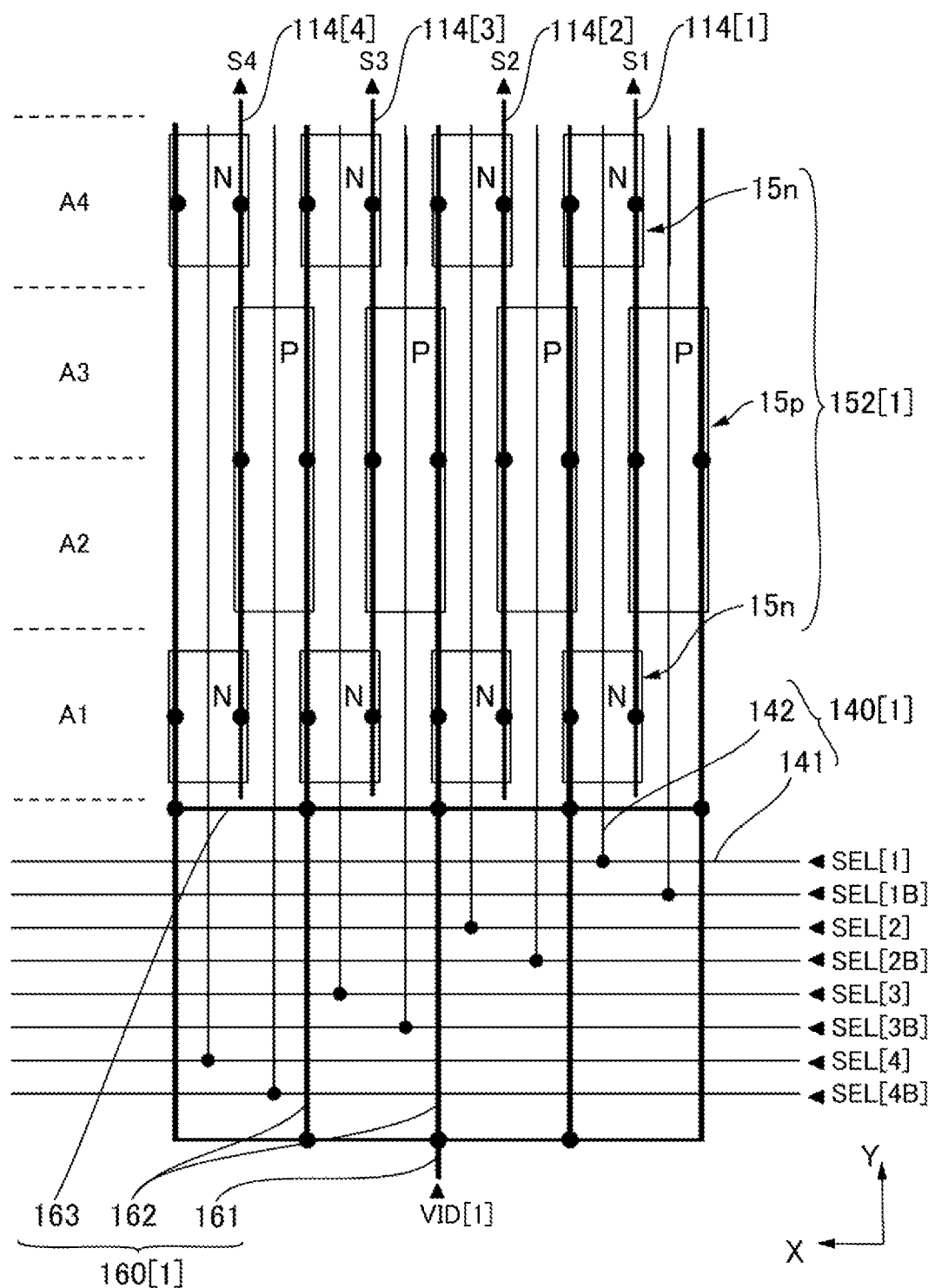
FIG. 16 is an explanatory view of an electro-optical device according to Modified Example of Exemplary Embodiment 4 of the present disclosure.

FIG. 16 is an explanatory view of the electro-optical device 1 according to Modified Example of Exemplary Embodiment 4 of the present disclosure, and illustrates a layout of the transmission gates 152. In Exemplary Embodiment 4, the two p-channel type transistors 15p are arranged between the two n-channel type transistors 15n. As illustrated in FIG. 16, an aspect of arranging one p-channel type transistor 15p may be adopted. In this configuration, a difference between the parasitic capacitances generated due to adjacent wiring lines and wiring line intersection can also be reduced in the positive logic selection signal SEL and the negative logic selection signal SEL.

Exemplary Embodiment 5

Figure 17:
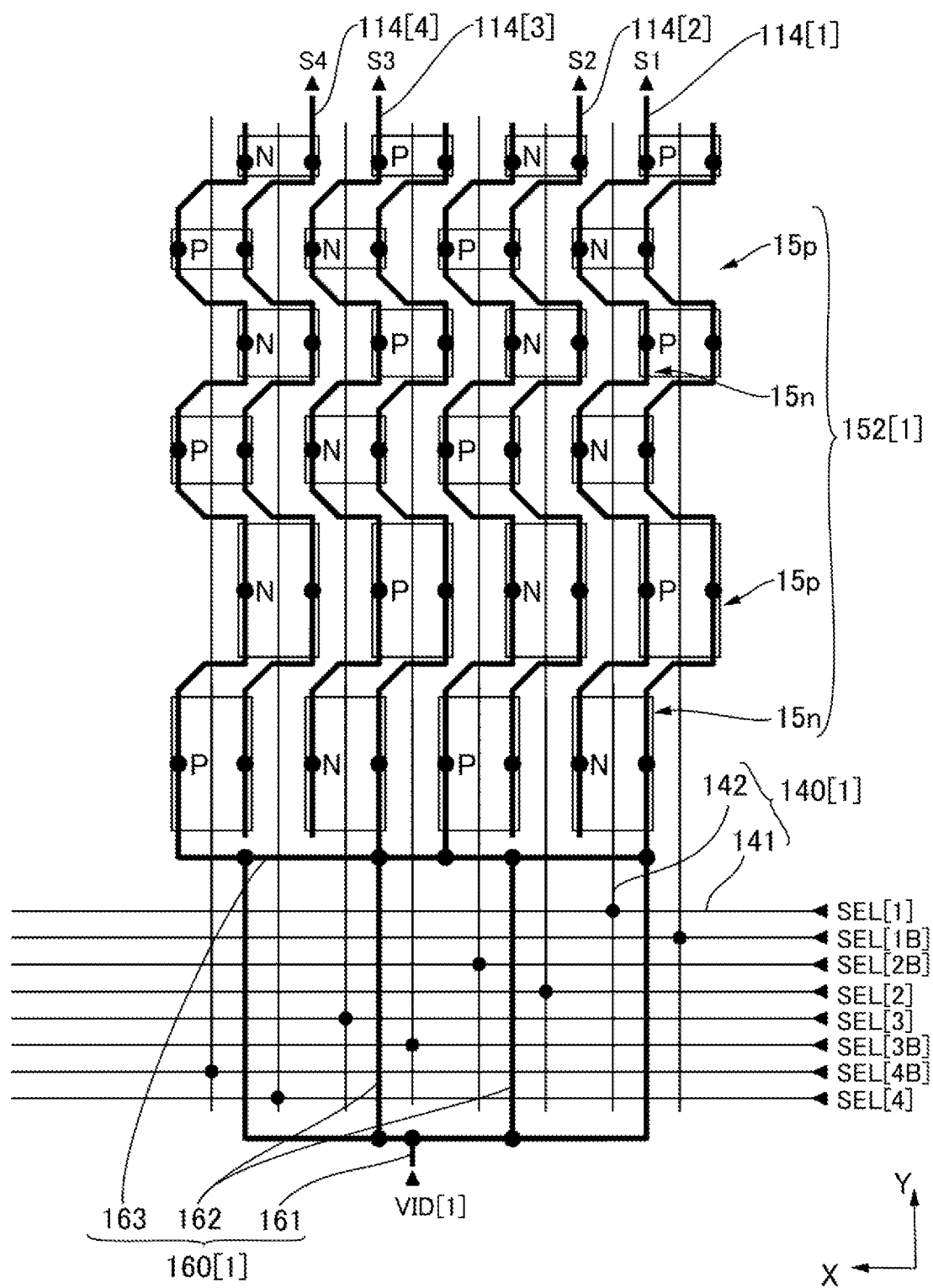
FIG. 17 is an explanatory view of an electro-optical device according to Exemplary Embodiment 5 of the present disclosure.

FIG. 17 is an explanatory view of the electro-optical device 1 according to Exemplary Embodiment 5 of the present disclosure. As illustrated in FIG. 17, in a case where a plurality of n-channel type transistors 15n and a plurality of p-channel type transistors 15p are arranged in the transmission gate 152, an aspect in which at least one of the plurality of re-channel type transistors 15n and the plurality of p-channel type transistors 15p includes a transistor having a different gate electrode area may be adopted. For example, there may be adopted an aspect in which at least one of the plurality of n-channel type transistors 15n and the plurality of p-channel type transistors 15p includes a transistor having a different gate electrode area, and in which transistors provided at positions closer to the main line part 141 in the second direction Y may include a transistor having a small gate electrode area as compared to transistors provided at positions far from the present branch line part 142 in the second direction Y. According to this configuration, the transistor having a large gate capacitance is arranged on a side close to the main line part 141 of the selection signal lines 140. Thus, switching of the transistors belonging to the branch line part 142 can be performed quickly, which is suitable for high-speed driving. The branch line part 142 is formed of, for example, a polysilicon film, a laminated film including a polysilicon film and a WSi film, and hence has a large resistance value. Therefore, when the transistor having a large gate capacitance is provided on the side close to the main line part 141 due to a large gate electrode area, switching can be performed at a small time constant. For example, in a case of a configuration in which the transmission gate 152 is provided with three n-channel type transistors 15n and three p-channel type transistors are provided 15p, a configuration in which a channel width of the transistor is reduced sequentially from 200 μm, 100 μm, and 50 μm from the side close to the main line part 141 is adopted.

Other Exemplary Embodiments

In the exemplary embodiments described above, a case where the first conductive-type transistor is the n-channel type transistor 15n and the second conductive-type transistor is the p-channel type transistor 15p is given as an example. However, the present disclosure may be applied to a case where the first conductive-type transistor is the p-channel type transistor 15p and the second conductive-type transistor is the n-channel type transistor 15n. In the exemplary embodiment described above, a case where the selection signal lines 140 extend from the one side of the first substrate 10 is given as an example. However, a case where the selection signal lines 140 extend from the right and left sides of the first substrate 10 may be adopted. In the exemplary embodiment described above, an aspect in which the drive IC 2 is mounted on the flexible wiring substrate 3 is illustrated. However, the present disclosure may be applied to a case where the drive IC 2 is mounted on the first substrate 10. In the exemplary embodiments described above, the electro-optical device 1 is the transmissive liquid crystal device. However, the disclosure may be applied to a case where the electro-optical device 1 is a reflection-type liquid crystal device or where the electro-optical device 1 is an organic electro luminescence device.

Installation Example to Electronic Apparatus

Figure 18:
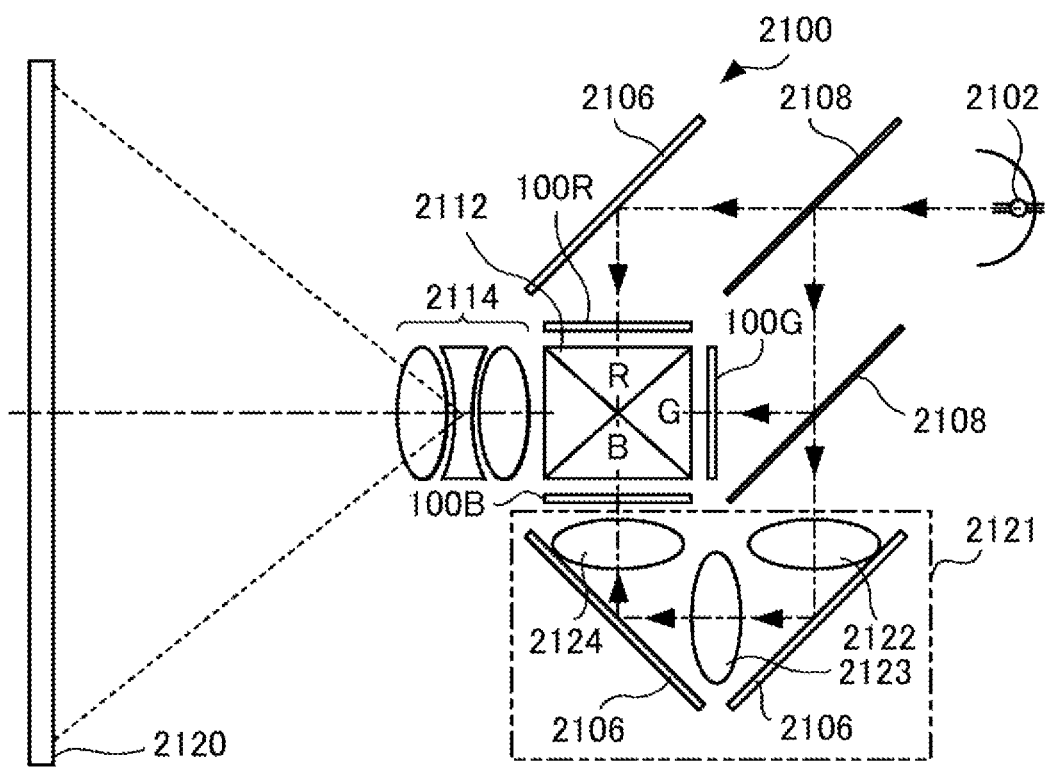
FIG. 18 is a schematic configuration view of a projection-type display apparatus using an electro-optical device to which the present disclosure is applied.

An electronic apparatus using the electro-optical device 1 according to the above-described exemplary embodiments is described below. FIG. 18 is a schematic configuration view of a projection-type display apparatus (electronic apparatus) using the electro-optical device 1 to which the present disclosure is applied.

The projection-type display apparatus 2100 illustrated in FIG. 18 is one example of an electronic apparatus using the electro-optical device 1. The projection-type display apparatus 2100, in which the electro-optical device 1 is used as a light valve, enables high-definition and bright display without increasing a size of the apparatus. As illustrated in this figure, a lamp unit 2102 (light-source unit) including a white light source such as a halogen lamp is provided inside the projection-type display apparatus 2100. Projection light emitted from the lamp unit 2102 is split into three primary colors of R (red), G (green), and B (blue) by three mirrors 2106 and two dichroic mirrors 2108 installed inside. The split projection light is guided to light valves 100R, 100G, and 100B corresponding to the respective primary colors. Note that the light of the B color has a long optical path as compared to the other light of the R color and the G color, and hence the light of the B color is guided via a relay lens system 2121 including an incidence lens 2122, a relay lens 2123, and an emission lens 2124 in order to prevent a loss of the light of the B color.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, images of the primary colors are synthesized, and then a color image is projected on a screen 2120 by a projection lens group 2114 (projection optical system).

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 1 to which the present disclosure is applied is not limited to the projection-type display apparatus 2100 of the exemplary embodiment described above. Examples of the electronic apparatus may include a projection-type head up display (HUD), a direct-view-type head-mounted display head mounted display (HMD), a personal computer, a digital still camera, and a liquid crystal television.

What is claimed is:

1. An electro-optical device, comprising:
   a plurality of data lines including m data lines grouped together, m being an integer equal to or greater than 2;
   a data signal line configured to output a data signal in accordance with a gray scale of a pixel correspondingly to the m data lines;
   m positive logic selection signal lines supplied with a positive logic selection signal;
   m negative logic selection signal lines supplied with a negative logic selection signal paired with the positive logic selection signal; and
   a transmission gate including an input end coupled to the data signal line and an output end coupled to any of the m data lines, a conduction state between the input end and the output end being defined based on the positive logic selection signal and the negative logic selection signal, wherein
   the transmission gate includes at least two first conductive-type transistors including a gate electrode supplied with the positive logic selection signal and a second conductive-type transistor including a gate electrode supplied with the negative logic selection signal, when an alignment direction of the plurality of data lines is a first direction, and an extension direction of the plurality of data lines is a second direction, the at least two first conductive-type transistors and the second conductive-type transistor are each arranged along the second direction, and the second conductive-type transistor is arranged between two first conductive-type transistors of the at least two first conductive-type transistors when viewed in the first direction
   the transmission gate is provided with a plurality of the second conductive-type transistors,
   the first conductive-type transistors and the second conductive-type transistors are alternately arranged when viewed in the first direction,
   each of the m positive logic selection signal lines and the m negative logic selection signal lines includes a main line part extending in the first direction and a branch line part extending in the second direction and being electrically coupled to the transmission gate, and
   at least one of the plurality of first conductive-type transistors and the plurality of second conductive-type transistors include transistors among which a transistor provided at a position farther, in the second direction, from the main line part has a smaller gate electrode area than a transistor provided at a position closer, in the second direction, to the main line part.

2. The electro-optical device according to claim 1, wherein
   the transmission gate is provided with the same number of the first conductive-type transistors and the second conductive-type transistors.

3. The electro-optical device according to claim 1, wherein
   the first conductive-type transistors and the second conductive-type transistors are arranged at positions deviated from each other in the first direction when viewed in the second direction.

4. The electro-optical device according to claim 3, wherein
   each of the m positive logic selection signal lines and the m negative logic selection signal lines includes a main line part extending in the first direction and a branch line part extending in the second direction from the main line part and being electrically coupled to the transmission gate, and
   the branch line part of each of the m positive logic selection signal lines and the branch line part of each of the m negative logic selection signal lines extend in the second direction in parallel to each other.

5. The electro-optical device according to claim 1, wherein
   the first conductive-type transistors and the second conductive-type transistors are arranged at the same position in the first direction when viewed in the second direction.

6. The electro-optical device according to claim 5, wherein
   each of the m positive logic selection signal lines and the m negative logic selection signal lines includes a main line part extending in the first direction and a branch line part extending in the second direction from the main line part and being electrically coupled to the transmission gate, and
   each of the branch line parts of the m positive logic selection signal lines and the branch line parts of the m negative logic selection signal lines, which extends in the second direction, is bent in a midway portion in the second direction such that the positive logic selection signal lines and the negative logic selection signal lines do not intersect with each other.

7. The electro-optical device according to claim 1, wherein
each of the m positive logic selection signal lines and the m negative logic selection signal lines includes a main line part extending in the first direction and a branch line part extending in the second direction from the main line part and being electrically coupled to the transmission gate, and
at least one of the branch line part of each of the m positive logic selection signal lines and the branch line part of each of the m negative logic selection signal lines includes a projection portion projecting at a midway portion in the second direction and overlapping the data line in plan view.

8. The electro-optical device according to claim 1, wherein
the transmission gate includes n (n is an integer equal or greater than 2) first conductive-type transistors and n second conductive-type transistors that are alternately arranged in the second direction, and
the electro-optical device further comprises another transmission gate adjacent to the transmission gate in the first direction, the another transmission gate including n first conductive-type transistors and n second conductive-type transistors that are alternately arranged in the second direction.

9. The electro-optical device according to claim 1, wherein
the transmission gate and a transmission gate adjacent to the transmission gate in the first direction have opposite alignment orders of the first conductive-type transistors and the second conductive-type transistors in the second direction.

10. The electro-optical device according to claim 1, wherein
at least one of the plurality of first conductive-type transistors and the plurality of second conductive-type transistors include transistors having different gate electrode areas.

11. An electronic apparatus, comprising:
the electro-optical device according to claim 1.

* * * * *